(12) United States Patent
Yamamoto et al.

(10) Patent No.: US 8,337,752 B2
(45) Date of Patent: Dec. 25, 2012

(54) STERILIZATION METHOD OF CONTAINER-PACKAGED FOOD AND FILLING SYSTEM

(75) Inventors: Shinji Yamamoto, Yokohama (JP); Takeshi Fukui, Yokohama (JP); Makoto Sawada, Yokohama (JP); Mitsuo Tanioka, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 344 days.

(21) Appl. No.: 12/812,234

(22) PCT Filed: Dec. 3, 2008

(86) PCT No.: PCT/JP2008/071943
§ 371 (c)(1),
(2), (4) Date: Jul. 8, 2010

(87) PCT Pub. No.: WO2009/087840
PCT Pub. Date: Jul. 16, 2009

(65) Prior Publication Data
US 2010/0296967 A1 Nov. 25, 2010

(30) Foreign Application Priority Data
Jan. 10, 2008 (JP) .................................. 2008-003315

(51) Int. Cl.
*A61L 2/08* (2006.01)
(52) U.S. Cl. ............... 422/26; 422/28; 422/302; 53/425; 53/426
(58) Field of Classification Search .................... 422/26, 422/28, 38, 292, 302; 53/425, 426, 440
See application file for complete search history.

(56) References Cited

U.S. PATENT DOCUMENTS
1,365,673 A * 1/1921 Fenn .............................. 426/402

FOREIGN PATENT DOCUMENTS
| JP | 56-29966 A | 3/1981 |
| JP | 61-48102 U | 3/1986 |
| JP | 61-93023 A | 5/1986 |
| JP | 3-14401 A | 1/1991 |

(Continued)

OTHER PUBLICATIONS
International Preliminary Report on Patentability for Application No. PCT/JP2008/071943 mailed Aug. 19, 2010.

(Continued)

*Primary Examiner* — Sean E Conley
(74) *Attorney, Agent, or Firm* — Cheng Law Group, PLLC

(57) ABSTRACT

To provide a sterilization method of container-packaged food which has a high effect on mixture food of solid food/soup and a filling system where all processes and devices can be simplified, a pre-seal lid material (PS), that has been cut to a dimension covering the opening of a cup filled with solid food, e.g. a dimension corresponding to the outer circumference of the flange of the cup, is fixed to a cup holder (CH) at a position for covering the cup opening by means of a holding bolt (31a) without being fusion bonded to the cup flange portion (CF), while a ventilation state between the head space of the cup and the air in a sterilization chamber is maintained. Thereafter, steam sterilization to the cup is performed in the sterilization chamber and the cup is transported to a clean box, filled with sterilized soup.

21 Claims, 16 Drawing Sheets

FOREIGN PATENT DOCUMENTS

| | | |
|---|---:|---|
| JP | 9-9937 A | 1/1997 |
| JP | 2005-118004 A | 5/2005 |
| JP | 2005-162278 A | 6/2005 |
| JP | 2005-341922 A | 12/2005 |
| JP | 2008-22803 A | 2/2008 |

OTHER PUBLICATIONS

International Search Report for the Application No. PCT/JP2008/071943 mailed Jan. 6, 2009.

* cited by examiner

Fig. 8
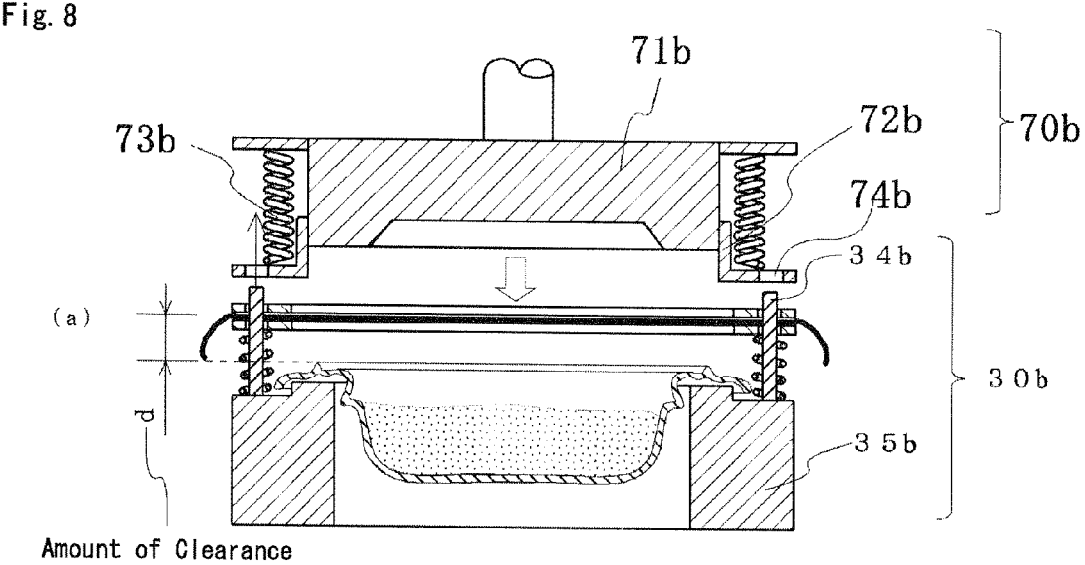
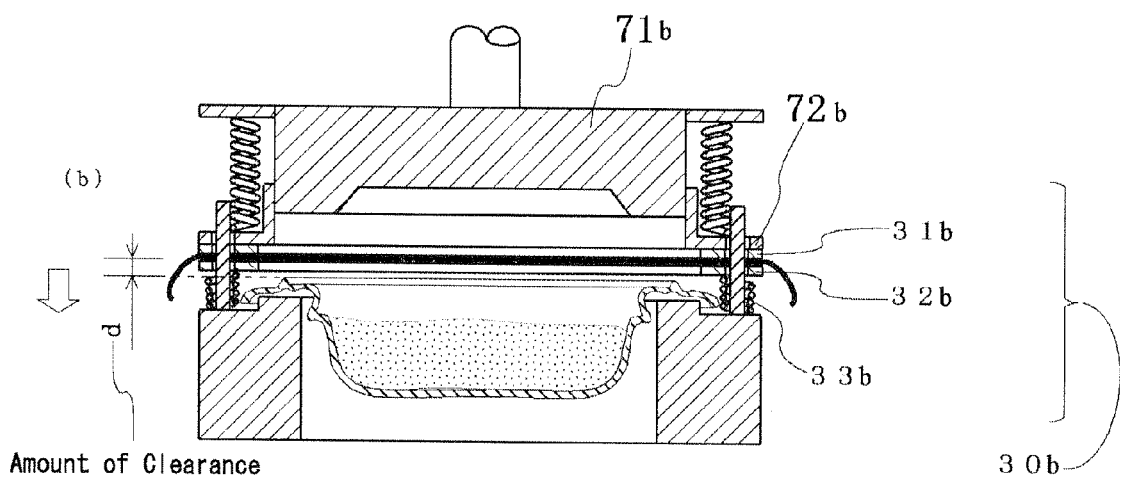
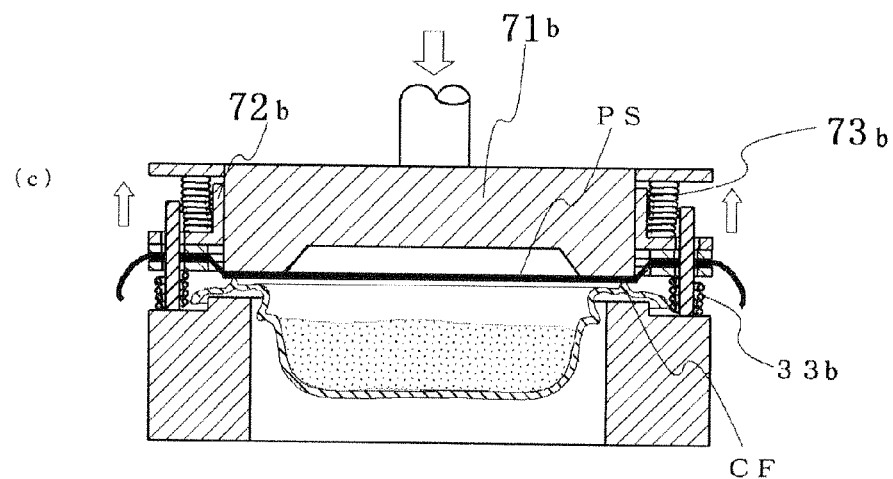

Fig. 15
(a)
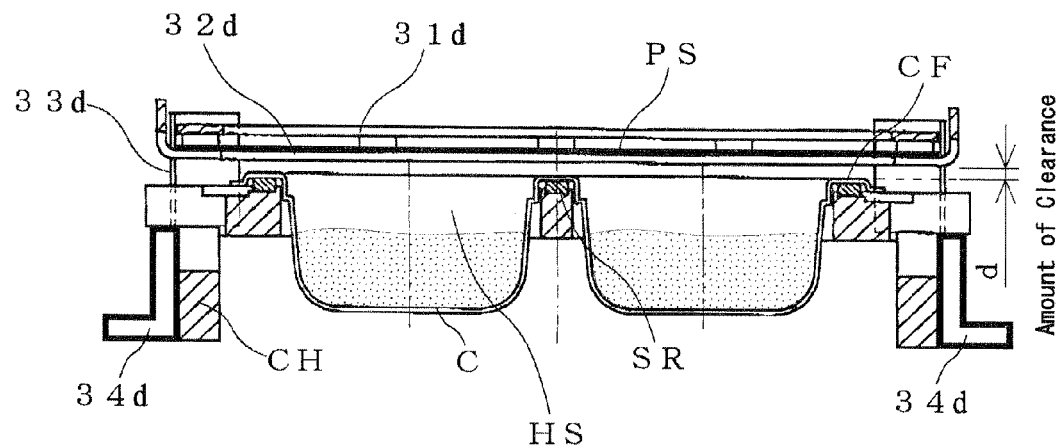
(b)
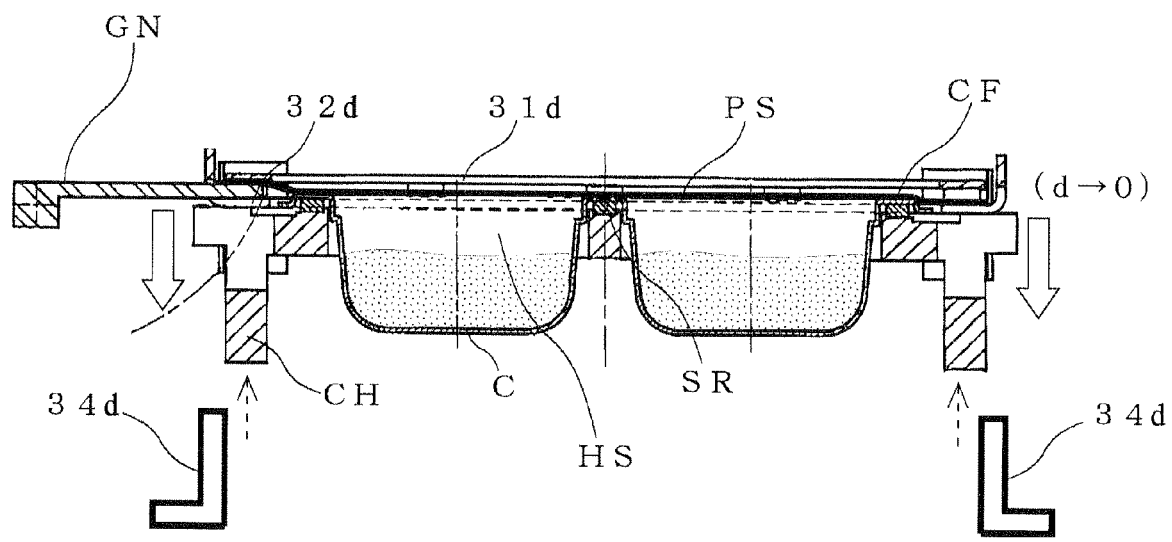

STERILIZATION METHOD OF CONTAINER-PACKAGED FOOD AND FILLING SYSTEM

TECHNICAL FIELD

The present invention relates to a sterilization method of container-packaged food and a filling system, and in particular relates to a sterilization method of container-packaged food and a filling system exhibiting a high sterilization effect on a mixture food of solid food/soup including juice and capable of simplifying the overall process and device configuration.

BACKGROUND ART

As a sterilization method of container-packaged food, a "retort sterilization method" is comprised of filling food in a container, sealing an opening of the container with a lid material and subsequently transporting the container to a chamber, and performing thermal sterilization with high temperature and pressure steam or compressed hot water, and a "steam injection sterilization method" of filling food in a container and thereafter introducing high temperature and pressure steam therein, and performing thermal sterilization while a heating medium such as steam directly comes in contact with the food. The steam injection sterilization method can be further classified into two types based on the supply system of the lid material. One is a sterilization method of subjecting a container filled with food to thermal sterilization using steam and thereafter sealing an opening of the container with a sterilized lid material which underwent separate sterilization (for example, refer to Patent Documents 1 and 2), and the other is a sterilization method of partially fusion bonding (temporarily sealing) a lid material on a flange portion of a container filled with food, and subsequently performing thermal sterilization by introducing high temperature and pressure steam, and thereafter sealing (main sealing) the lid material with a heat seal bar by fusion bonding it to the flange portion of the container (for example, refer to Patent Document 3).

With the former sterilization method, in addition to a device for sterilizing the container filled with food, a separate device for sterilizing the lid material is required. Meanwhile, with the latter sterilization method, in addition to a sealing device for completely fusion bonding the lid material to the flange portion of the container, a temporary sealing device for partially fusion bonding the lid material to the flange portion of the container is separately required.

Patent Document 1: Japanese Published Unexamined Patent Application Publication No. H09-009937
Patent Document 2: Japanese Published Unexamined Patent Application Publication No. 2005-341922
Patent Document 3: Japanese Published Unexamined Patent Application Publication No. 2005-118004

DISCLOSURE OF THE INVENTION

Problem to be Solved by the Invention

Among the conventional steam injection sterilization methods, with the sterilization method that seals the sterilized container filled with food with a sterilized lid material, although a temporary sealing device is not required, a separate device for sterilizing the lid material is required.

Meanwhile, with the conventional steam injection sterilization method that involves a temporary sealing process, since the food, the container and the lid material are simultaneously sterilized, a separate device for sterilizing the lid material is not required. A process and device for individually sterilizing the lid material are not required and, therefore, the overall process and device configuration can be simplified.

Nevertheless, if the difference between the contraction percentage of the container and the contraction percentage of the lid material is significant upon introducing high temperature and pressure steam, there is a problem in that, since a part of the lid material is bound by the flange of the container, stress will be applied to the flange portion of the container when the lid material contracts, and the flange portion of the container will deform due to such stress.

Meanwhile, in cases where the contents of the foregoing container-packaged food are a mixture of solid food/soup containing solid food and soup including juice, if the food is to be directly produced with the steam sterilization method, there is a problem in that the sterilization time will be longer in comparison to the time required for sterilizing only solid food due to the existence of the soup. In addition, if the vacuum cooling method is adopted for the cooling of the mixture of solid food/soup after thermal sterilization, there is a problem in that the soup will be dispersed outside of the container and hinder the commercialization of the product, and the dispersed liquid will lead to environmental pollution of the surroundings. Cooling based on inert (nitrogen) gas with minimal liquid dispersion can also be used in substitute for the vacuum cooling method, but in the foregoing case, there is a problem in that a large amount of cooling gas will be required and that much time will be required to perform the cooling.

Thus, the present invention aims to overcome the foregoing problems encountered in the conventional sterilization method and system of container-packaged food. Thus, an object of this invention is to provide a sterilization method of container-packaged food and a filling system having a high sterilization effect on the food and capable of simplifying the overall process and device configuration, and also capable of shortening the sterilization time, preventing liquid dispersion, and performing cooling in a short period when the contents are a mixture of solid food/soup.

Means for Solving the Problem

The sterilization method of container-packaged food claimed in claim 1 for achieving the foregoing object is a sterilization method of container-packaged food which simultaneously subjects a container and a lid material to thermal sterilization by introducing high temperature and pressure steam into a sterilization chamber, wherein the food is a mixture of solid food/soup including juice, a container that is pre-filled with solid food is mounted on a holder of the sterilization chamber, the steam is introduced into the sterilization chamber while a pre-seal lid material that is pre-cut to a dimension to at least cover an opening of the container is retained at a position covering the opening of the container without being fusion bonded to the container and a ventilation state is maintained between a head space of the container and the inside of the sterilization chamber, the container and the pre-seal lid material are simultaneously subjected to thermal sterilization together with the solid food, and sterilized soup is thereafter filled in the container.

With the foregoing sterilization method of container-packaged food, since the pre-seal lid material is retained at a position covering the opening of the container without being fusion bonded to the container and a ventilation state between a head space of the container and the inside of the sterilization chamber is maintained, the steam will enter the inside of the container during the inflow of the high temperature and pressure steam and thermally sterilize the food in a suitable manner. In addition, since the pre-seal lid material is not fusion bonded to the flange of the container, the flange of the container will not deform due to the contraction of the pre-seal lid material and, in addition to the food and the container, the lid material will also be thermally sterilized in a similar manner. Moreover, a temporary sealing process is no longer required and, consequently, a temporary sealing device is also no longer required. In addition, since the lid material is also simultaneously sterilized, a device for sterilizing the lid material is also no longer required. Furthermore, if the pre-seal lid material is preliminarily cut to a size corresponding to the flange portion of the container, it is not necessary to perform trimming after the sealing process, and a trimming device is no longer required. Consequently, the overall process and the device can be simplified. Moreover, even if the contents are a mixture of solid food/soup, since the inside of the sterilization chamber is subjected to steam sterilization in a state where only the solid food is foremost filled and the sterilized soup is subsequently filled, sterilization can be performed in a short time in comparison to the time required for directly sterilizing a mixture of solid and liquid, and the nutritive value will not be lost due to the thermal degradation of the contents. In addition, since the solid food and the soup are separately sterilized, optimal sterilization can be performed for both the solid food and the soup, respectively. Accordingly, it is possible to obtain a high quality heated container-packaged food of a mixture of solid food/soup.

With the sterilization method of container-packaged food claimed in claim 2, the pre-seal lid material is retained by partially pressing a portion of the pre-seal lid material that is protruding from an outer edge of a flange of the container against the holder. Moreover, with the sterilization method of container-packaged food claimed in claim 3, the pre-seal lid material is retained by partially pressing a non-heat seal portion of the pre-seal lid material on a flange of the container against the flange. Further, with the sterilization method of container-packaged food claimed in claim 4, the pre-seal lid material is retained at a distance from a flange of the container while holding an edge of the pre-seal lid material.

With the foregoing sterilization method of container-packaged food, as a result of adopting the configuration of any one of foregoing claims 2 to 4, since the contraction of the lid material will not affect the container during the inflow of the high temperature and pressure steam, the lid material can be retained without coming off, and the flow of the steam into the container will be facilitated. Therefore, the food, the container and the pre-seal lid material can be thermally sterilized in a suitable manner.

With the sterilization method of container-packaged food claimed in claim 5, an amount of clearance from the flange of the container to the pre-seal lid material is ensured to be large when the steam is introduced into the sterilization chamber and when soup is filled in the container, and ensured to be small when air in the head space of the container is replaced with inert gas.

With the foregoing sterilization method of container-packaged food, as a result of adopting the foregoing configuration, a sufficient amount of steam will flow along the inner and outer periphery of the container during thermal sterilization. Consequently, the food, the pre-seal lid material, the container and the solid food can be thermally sterilized with expedition, and the soup can be filled in the container with precision. Meanwhile, during the inert gas substitution of the head space, the head space of the container can be efficiently filled with inert gas while the escape of inert gas is minimized.

With the sterilization method of container-packaged food claimed in claim 6, the steam is introduced into the sterilization chamber after subjecting the sterilization chamber to vacuum depressurization, and discharged therefrom after being retained for a predetermined time. With the foregoing sterilization method of container-packaged food, the inflow velocity of the steam will increase by subjecting the sterilization chamber to vacuum depressurization. Consequently, the flow rate of the steam to flow into the sterilization chamber will increase and, consequently, the quantity of heat that is supplied per unit time will increase. In addition, as a result of retaining the steam for a predetermined period, the quantity of heat that is supplied to the sterilization chamber will be sufficiently transferred to the solid food filled in the container, the container and the lid material, and the solid food, the container and the lid material will be suitably heated and sterilized in a short period of time.

With the sterilization method of container-packaged food claimed in claim 7, upon discharging the steam from inside the sterilization chamber, pressure in the sterilization chamber is adjusted by introducing inert gas or air into the sterilization chamber so that pressure in the sterilization chamber is higher by 0.01 to 0.1 MPa in relation to saturated steam pressure at a temperature of the food, and then the container and the pre-seal lid material are cooled.

As a result of intense study, the present inventors discovered that if the pressure in the sterilization chamber is 0.01 MPa or lower in comparison to the saturated steam pressure at the temperature of the food, it is undesirable since the bursting of solid food and bumping of moisture will easily occur and, contrarily, if the pressure in the sterilization chamber is 0.1 MPa or higher in comparison to the saturated steam pressure at the temperature of the food, there is no change in the effect of preventing the bursting of solid food, and that it is uneconomical since the amount of inert gas or the like to be introduced will merely increase.

Thus, with the foregoing sterilization method of container-packaged food, by suitably introducing the inert gas or the like into the sterilization chamber, and setting the pressure in the sterilization chamber to be higher by 0.01 to 0.1 MPa than the saturated steam pressure at a temperature of the solid food, the bursting of solid food can be effectively prevented. Incidentally, pressure in the sterilization chamber may be adjusted while measuring the temperature of the food during the production, or, by experimentally measuring the temperature change of the solid food in advance, the pressure may be adjusted based on such data during the production.

With the sterilization method of container-packaged food claimed in claim 8, after discharging the steam, the container and the pre-seal lid material are cooled while depressurizing the sterilization chamber.

With the foregoing sterilization method of container-packaged food, heat exchange will take place between the sensible heat of the container or the like and the latent heat of the air due to the adiabatic expansion of the air when returning to atmospheric pressure after depressurization. Consequently, the container will lose a part of the sensible heat as the latent heat of the air. The container or the like can be suitably cooled thereby. Moreover, it is also possible to promote the gasification of condensed water and prevent the solid food from absorbing water.

With the sterilization method of container-packaged food claimed in claim 9, the soup is subjected to high-temperature short-time sterilization and cooled, and thereafter filled in a container containing sterilized solid food which has been transferred from the sterilization chamber to an aseptic room, and the solid food and the container are cooled by the soup.

With the foregoing sterilization method of container-packaged food, since the soup is subjected to high temperature sterilization in a short period of time, it is possible to prevent the thermal degradation of the soup, and, since cold soup is filled in the container containing solid food after the steam sterilization, the solid food is cooled by the soup. Consequently, it is not necessary to cool the container containing solid food in the sterilization chamber for a long period of time, and the container can be removed from the sterilization chamber in a high temperature state.

With the sterilization method of container-packaged food claimed in claim 10, after cooling the container and the pre-seal lid material, gas substitution is performed by introducing inert gas into a head space of the container through a gas substitution nozzle for a predetermined period, and the gas substitution nozzle is thereafter retracted and the container opening is sealed.

With the foregoing sterilization method of container-packaged food, the gas substitution nozzle will not obstruct the heat sealing of the opening of the container.

With the sterilization method of container-packaged food claimed in claim 11, filling of the soup, the gas substitution, and sealing of the container opening are performed in a clean box.

With the foregoing sterilization method of container-packaged food, since filling of the soup, the gas substitution and sealing of the container opening are performed in a clean box, it is possible to realize aseptic filling or obtain high quality container-packaged food of mixture of solid food/soup that is equivalent to food produced from aseptic filling.

In order to achieve the foregoing object, the filling system of container-packaged food claimed in claim 12 is a filling system of container-packaged food equipped with a holder for mounting a container filled with food, and steam supply means for supplying, to a sterilization chamber, high temperature and pressure steam for simultaneously sterilizing the container and a lid material, wherein the food is a mixture of solid food/soup, the filling system further having: container retention means for retaining a pre-seal lid material that is pre-cut to a dimension to at least cover an opening of the container at a position covering the opening of the container without being fusion bonded to the container and maintaining a ventilation state between a head space of the container and the inside of the sterilization chamber; and soup high-temperature short-time sterilization means for sterilizing soup at a high temperature and short time, the container and the pre-seal lid material being simultaneously subjected to thermal sterilization together with the solid food, and soup that has been sterilized by the soup high-temperature short-time sterilization means being filled in a sterilized container with solid food.

With the foregoing filling system of container-packaged food, the sterilization method of container-packaged food according to foregoing claim 1 can be suitably implemented.

With the filling system of container-packaged food claimed in claim 13, the container retention means is configured from a plate having a pin for pressing a portion of the pre-seal lid material that is protruding from an outer edge of a flange of the container, and the holder for receiving the pin.

With the foregoing filling system of container-packaged food, the sterilization method of container-packaged food according to foregoing claim 2 can be suitably implemented.

With the filling system of container-packaged food claimed in claim 14, the container retention means is configured from a plate having a pin for pressing a non-heat seal portion of the pre-seal lid material on a flange of the container, and the holder for receiving the pin.

With the foregoing filling system of container-packaged food, the sterilization method of container-packaged food according to foregoing claim 3 can be suitably implemented.

With the filling system of container-packaged food claimed in claim 15, the container retention means is configured from a grip for holding an edge of the pre-seal lid material, support means for supporting the grip, and guide means for guiding the grip to a predetermined position.

With the foregoing filling system of container-packaged food, the sterilization method of container-packaged food according to foregoing claim 4 can be suitably implemented.

The filling system of container-packaged food claimed in claim 16 comprises clearance amount adjustment means for adjusting an amount of clearance from a flange of the container to the pre-seal lid material.

With the filling system of container-packaged food, the sterilization method of container-packaged food according to foregoing claim 5 can be suitably implemented.

With the filling system of container-packaged food claimed in claim 17, the steam supply means includes a vacuum pump, introduces steam into the sterilization chamber after having subjected the inside of the sterilization chamber to vacuum depressurization, and discharges therefrom the steam after retaining the steam for a predetermined time.

With the foregoing filling system of container-packaged food, the sterilization method of container-packaged food according to foregoing claim 6 can be suitably implemented.

With the filling system of container-packaged food claimed in claim 18, upon discharging the steam from inside the sterilization chamber, pressure in the sterilization chamber is adjusted by introducing inert gas or air into the sterilization chamber so that pressure in the sterilization chamber is higher by 0.01 to 0.1 MPa in relation to saturated steam pressure at a temperature of the food, and then the container and the pre-seal lid material are cooled.

With the foregoing filling system of container-packaged food, the sterilization method of container-packaged food according to foregoing claim 7 can be suitably implemented.

With the filling system of container-packaged food claimed in claim 19, the after discharging the steam, the container and the pre-seal lid material are cooled while depressurizing the sterilization chamber.

With the foregoing filling system of container-packaged food, the sterilization method of container-packaged food according to foregoing claim 8 can be suitably implemented.

The filling system of container-packaged food claimed in claim 20 comprising a soup filling nozzle for filling soup in a container from which the steam has been discharged, and filling nozzle displacement means for displacing the filling nozzle in order to fill soup in the container from a gap between an opening of the container and the lid material or by lifting the lid material retaining means for retaining the lid material.

With the foregoing filling system of container-packaged food, the soup filling nozzle can be accurately displaced to a position for filling the soup in the container.

With the filling system of container-packaged food claimed in claim 21, after cooling the container and the pre-seal lid material, gas substitution is performed by introducing inert gas into a head space of the container with a gas substitution nozzle for a predetermined period, and the gas substitution nozzle is thereafter retracted and the container opening is sealed.

With the foregoing filling system of container-packaged food, the sterilization method of container-packaged food according to foregoing claim 10 can be suitably implemented.

Effects of the Invention

According to the sterilization method of container-packaged food of the present invention, since the pre-seal lid material, which is pre-cut to a dimension to at least cover an opening of the container, is retained at a position covering the opening of the container without being fusion bonded to the container and a ventilation state between a head space of the container and the inside of the sterilization chamber is maintained, the following effects are yielded.

(1) The container and the food and the lid material can be simultaneously sterilized.
(2) The dispersion of food due to the inflow of steam can be suitably prevented.
(3) A temporary sealing process and its incidental temporary sealing device are no longer required.
(4) Even when the contraction percentages of the container and the lid material are different each other, the flange portion of the container will not deform.

Particularly, in comparison to retort sterilization, the following effects are yielded.
(5) Contents including a mixture of solid food/soup can be sterilized in a short period of time, the nutritive value of the contents will not be lost due to thermal degradation, and high quality container-packaged food can be obtained.
(6) The solid food and the soup can be respectively subjected to optimal sterilization.
(7) Since the steam will not come in direct contact with the food, the efficiency of heat transfer to the food will increase and, consequently, the time required for the sterilization treatment can be shortened.
(8) Since the opening of the container is sealed after the sterilization treatment is complete, the internal pressure of the container can be controlled easily.
(9) If the container is a multi-container type, no concavo-convex surface will be formed on the lid material even though different contents are filled in the respective containers.

BRIEF DESCRIPTION OF THE DRAWINGS

FIG. 8 is an explanatory diagram showing the operation of the lid material holder and the heat seal bar.

FIG. 15 is an explanatory diagram showing the adjustment of amount of clearance d during thermal sterilization or inert gas substitution of the head space.

EXPLANATION OF REFERENCE NUMERALS

Figure 1:
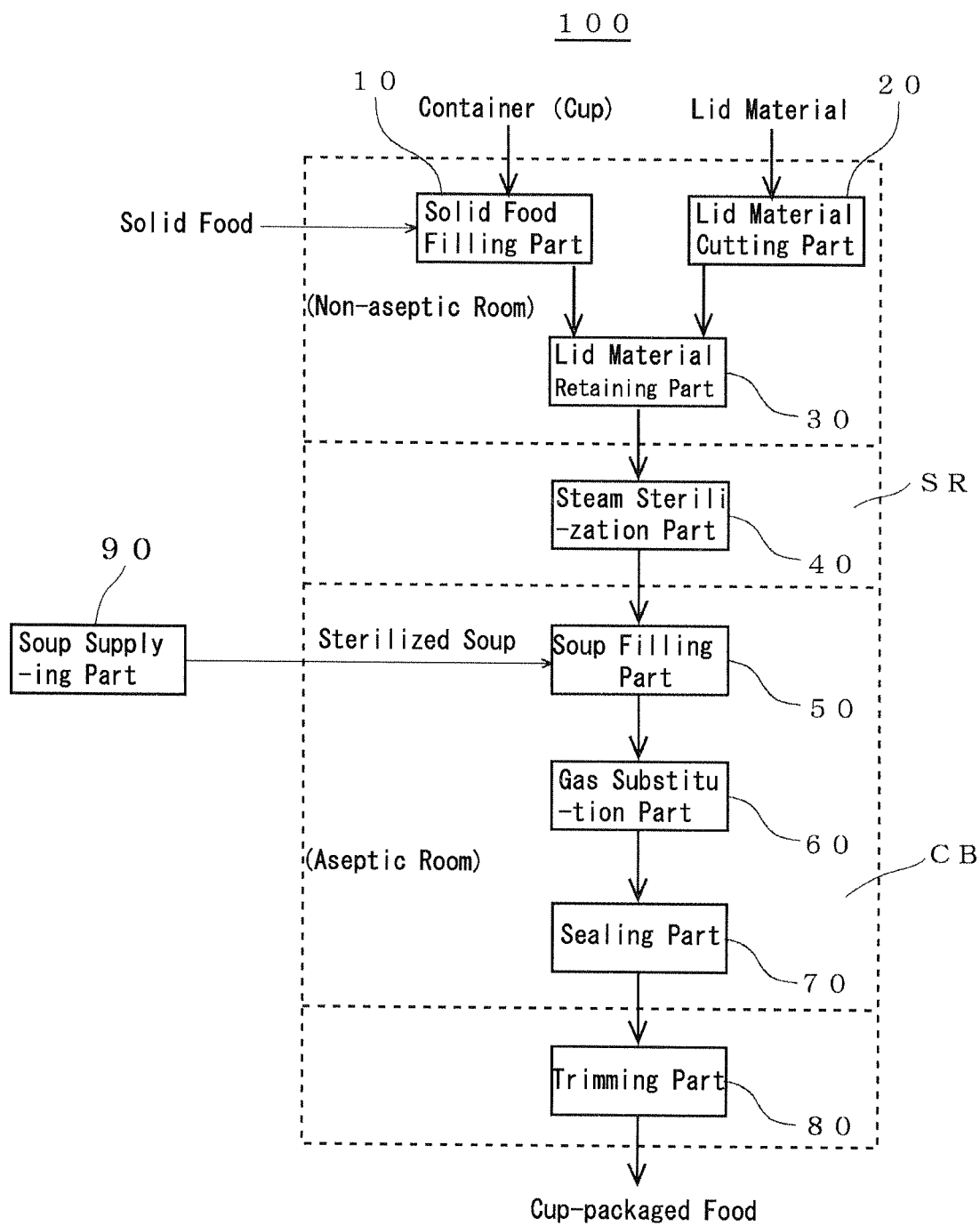
FIG. 1 is an explanatory diagram showing the configuration of the filling system of container-packaged food according to the present invention.

10 Solid food filling part
20 Lid material cutting part
30 Lid material retaining part
40 Steam sterilization part
50 Soup filling part
60 Gas substitution part
70 Sealing part
80 Trimming part
90 Soup supplying part
100 Filling system of solid cup-packaged food

BEST MODE FOR CARRYING OUT THE INVENTION

The present invention is now explained in further detail based on the embodiments shown in the drawings. Note that, the present invention shall not be limited by the embodiments in any way.

Figure 2:
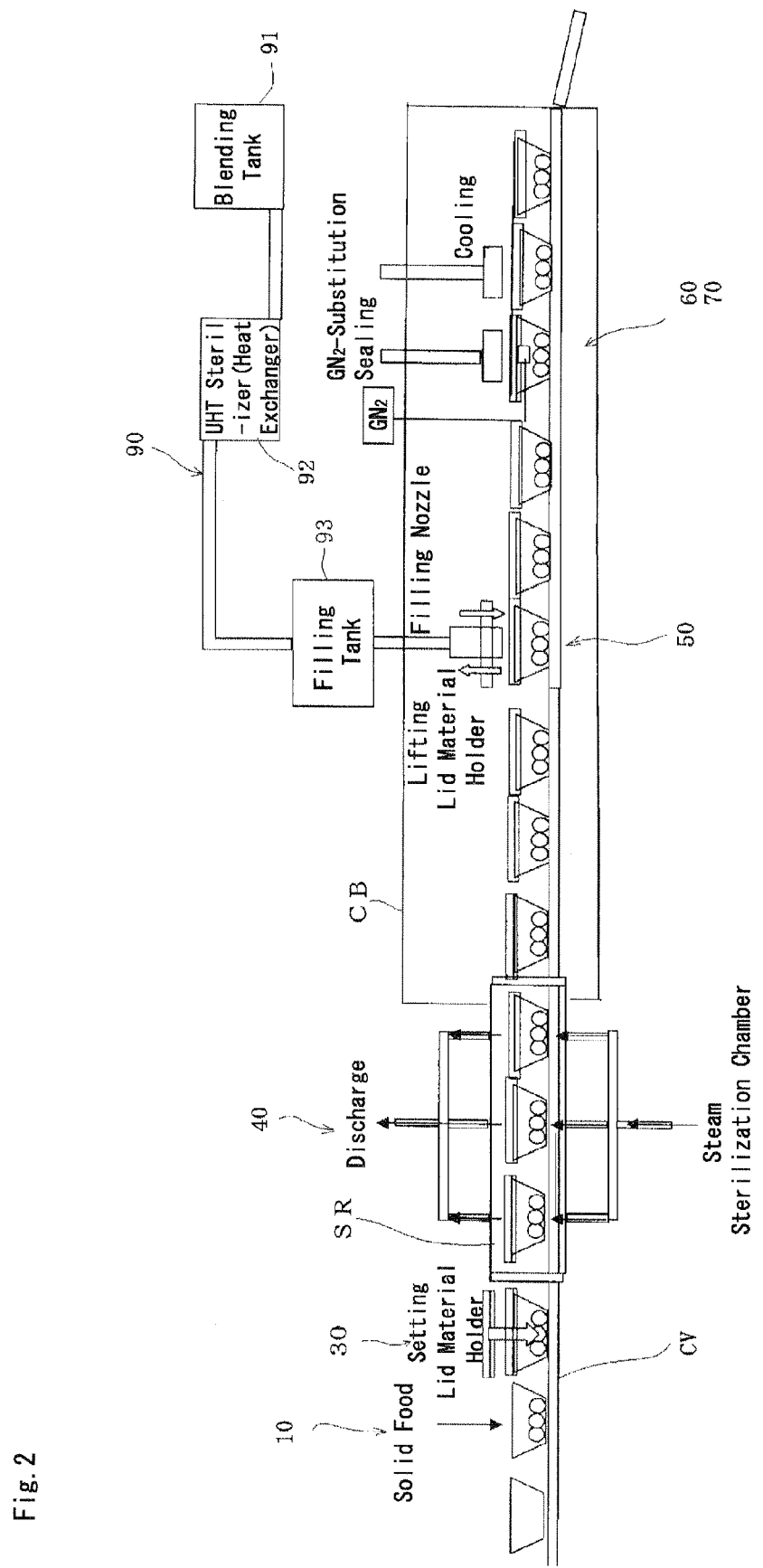
FIG. 2 is a schematic diagram showing the line configuration of the filling system.

FIG. 1 is an explanatory diagram showing an embodiment of a filling system 100 of cup-packaged food according to the present invention, and FIG. 2 is a schematic line diagram thereof.

The filling system 100 of cup-packaged food according to this embodiment is configured from a solid food filling part 10 for filling solid food in a cup, a lid material cutting part 20 for cutting the lid material in advance to a dimension that covers the opening of the cup, a lid material retaining part 30 for fixing a pre-seal lid material while maintaining a ventilation state between a head space of the cup and the air inside the sterilization chamber without fusion bonding the cut lid material (pre-seal lid material) to the cup, a steam sterilization part 40 for simultaneously subjecting, in the foregoing state, the cup filled with solid food and the lid material to thermal sterilization using high temperature and pressure steam, a soup filling part 50 for filling sterilized soup in the cup filled with solid food which was subjected to thermal sterilization, a gas substitution part 60 for performing inert gas substitution of the head space of the cup, a sealing part 70 for sealing an opening of the cup by fusion bonding the pre-seal lid material to the flange of the cup, and a trimming part 80 for cutting the excess lid material that is protruding from the flange. The filling system additionally comprises a soup supplying part 90 for sterilizing and cooling the soup and subsequently supplying it to the soup filling part 50. The soup supplying part 90 is configured from a soup mixing tank for blending the soup, a UHT sterilization device (heat exchanger) 92 as a high-temperature short-time sterilization device for subjecting the blended soup to high-temperature short-time sterilization and a cooling device for cooling the blended soup after the high-temperature sterilization, and a filling tank 93. The steam sterilization part 40 is configured as a steam sterilization chamber (steam sterilization pot) SR, and an environment equivalent to a general chamber will suffice up to the entrance of the steam sterilization part 40, but the range from the exit of the steam sterilization part 40 to at least the exit of the soup filling part 50, the gas substitution part 60, and the sealing part 70 must be an aseptic environment or a clean environment, and these are disposed within a clean box CB.

In the solid food filling part 10, a prescribed amount of solid food such as beams, potatoes, chestnuts, corn, and other ingredients is filled in the cup with a filling machine. As the cup, for example, an open-mouthed heat-resistant plastic container or an aluminum foil container having a flange seal face may be used.

The lid material cutting part 20 prepares a pre-seal lid material that is cut to a dimension that covers the opening of the cup; for instance, to a dimension corresponding to the outer circumference of the flange of the cup. As the quality of the lid material, for instance, used may be a plastic film, an aluminum foil or a laminated composite film thereof. Desirably, the thermal contraction percentage of the lid material is equal to or less than the thermal contraction percentage of the cup.

The lid material retaining part 30 does not partially fusion bond (temporarily seal) the lid material to the container as with a conventional filling system of solid cup-packaged food, but rather retains and fixes the pre-seal lid material using the lid material retention means described later while maintaining the ventilation state between the head space of the container and the outside air without fusion bonding the pre-seal lid material to the container. Consequently, the temporary sealing process of partially fusion bonding the lid material to the cup and the temporary sealing device required for such process are no longer needed, and the overall process of the system and the configuration of the device can thereby be simplified. The lid material retention means will be described in detail later with reference to FIG. 4 to FIG. 9, FIG. 14, and FIG. 15.

Figure 3:
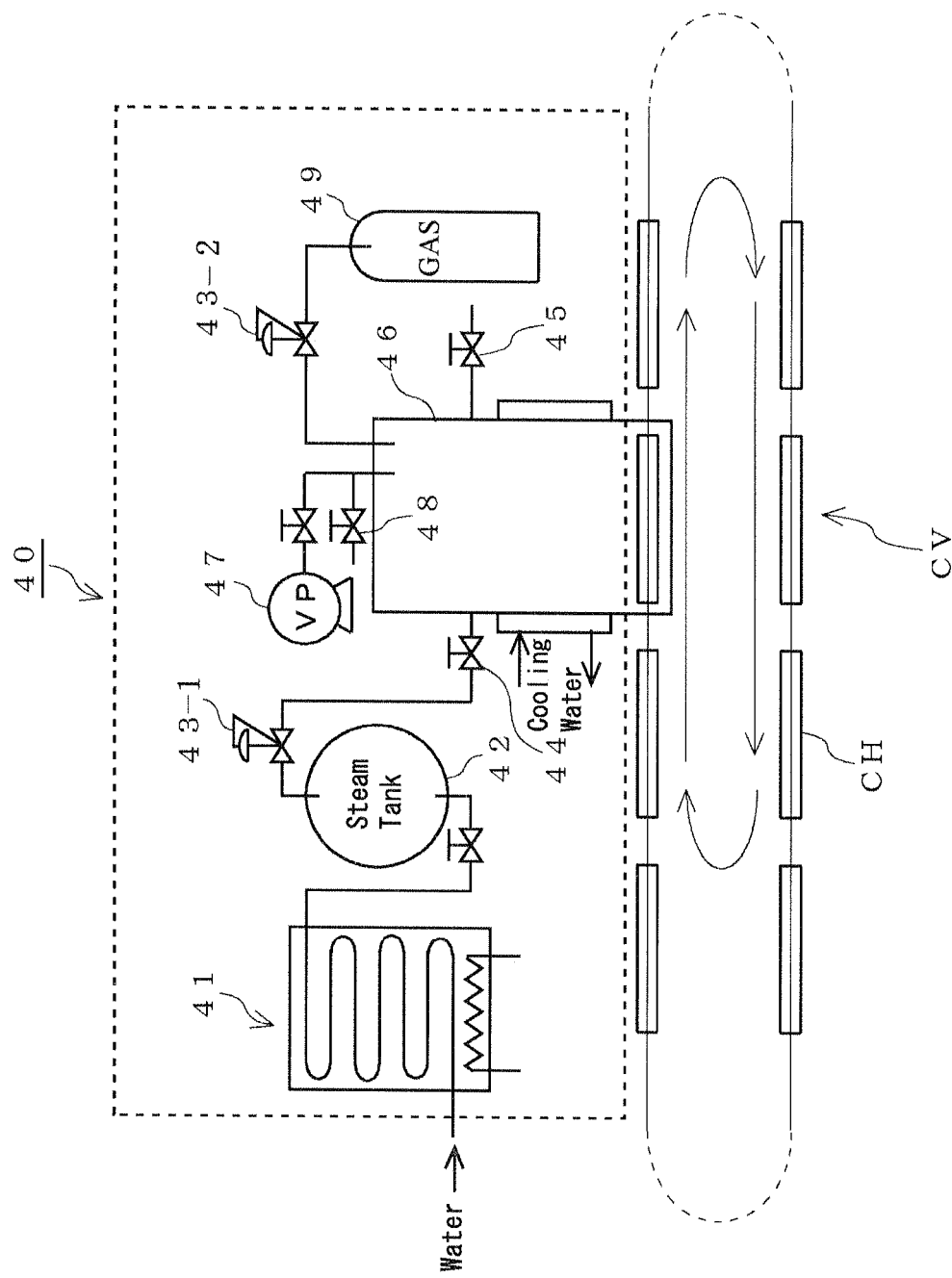
FIG. 3 is an explanatory diagram showing the configuration of a steam sterilization part.

As shown in FIG. 3, the steam sterilization part 40 includes a steam generator 41 for generating high temperature and pressure steam, a steam tank 42 for storing the steam, a regulator 43-1 for regulating the steam supply pressure to a prescribed pressure, an inlet valve 44 for interrupting (turning ON/OFF) the inflow of steam to the sterilization chamber 46, an outlet valve 45 for interrupting the outflow of such steam, a sterilization chamber 46 for mounting a cup filled with food as the object to be heated, a vacuum pump 47 for depressurizing the sterilization chamber 46, an atmospheric pressure return valve 48 for breaking the vacuum state of the sterilization chamber 46, a gas tank 49 for storing air or inert gas, and a depressurization valve 43-2 for adjusting the supply pressure of the gas.

Moreover, the conveyer CV is a so-called endless conveyer belt that comprises a cup holder CH for receiving the cup, and is configured from one or a series of a plurality of conveyer groups that circle a path of sequentially transporting the cup to the solid food filling part 10, the lid material retaining part 30, the steam sterilization part 40, and the soup filling part 50, the gas substitution part 60, and the sealing part 70 in the clean box CB, and ejecting the sealed container from the clean box CB and transporting it to the trimming part 80.

As the method of supplying steam to the sterilization chamber 46, the high temperature and pressure steam may be supplied under ordinary pressure after transporting the container to the sterilization chamber 46, or supplied after vacuuming the inside of the sterilization chamber 46. As a result of subjecting the inside of the sterilization chamber 46 to vacuum degasification in advance, the steam will instantaneously flow into the chamber 46 to the gap of the food and the food and container can thereby be heated efficiently (thermal sterilization). For example, such as 10 minutes at 120° C. or higher, 5 minutes at 130° C. or higher, or 5 seconds at 160° C. or higher can be used as the sterilization time (retention time of steam in the sterilization chamber 46).

As the method of discharging residual steam of the sterilization chamber 46, the outlet valve may simply be opened in order to discharge the steam, or the steam may be discharged by adjusting the depressurization rate of the internal pressure of the sterilization chamber 46 by introducing gas simultaneously with the discharge of the steam. With respect to the depressurization rate, the inside of the sterilization chamber 46 is depressurized while introducing gas into the sterilization chamber 46 so that $0.01$ [MPa]$<P-PS<0.1$ [MPa] is realized when the saturated steam pressure is PS and the internal pressure of the sterilization chamber 46 is P; that is, so that the internal pressure of the sterilization chamber 46 will be higher by 0.01 to 0.1 [MPa] in relation to the saturated steam pressure PS. Conventionally, when the outlet valve was fully opened to rapidly discharge the steam in order to quicken the cooling process, there were cases of the moisture bumping or the solid food bursting. However, as a result of discharging the steam upon adjusting the depressurization rate while introducing the gas as described above, bursting of the solid food can be suitably prevented. In addition, if steam is discharged only by regulating the outlet valve, this is undesirable since the cooling process will slow down and much time will be required for the sterilization process.

Moreover, for example, inert gas such as nitrogen or high pressure air may be considered as the gas to be introduced. Accordingly, when using inert gas such as nitrogen, since the head space of the container will be filled with inert gas simultaneously with the discharge of steam, the following gas substitution process can be omitted. Consequently, the gas substitution part 60 that is positioned posterior to the steam sterilization part 40 can be omitted.

Moreover, as the method of cooling the container after thermal sterilization, in order to further promote the cooling process, depressurization cooling may be performed as well as water cooling of the inside, or water cooling of the sterilization chamber from the outside. Generally speaking, with steam injection, the food tends to absorb the condensed water of the steam and become to be with high water. If depressurization cooling is performed, cooling is promoted and excess moisture is eliminated since the condensed water is gasified, and the effect of preventing the food from absorbing water is yielded. Nevertheless, in this embodiment, since cooled soup is filled in the container after it is transported to a clean box and the container is cooled by the soup as described later, cooling in the sterilization chamber is not necessarily required, and the container can be ejected from the sterilization chamber in a hot state.

With the soup filling part 50, the soup filling nozzle is inserted between the lid material and the flange of the container, which was subjected to steam sterilization with the steam sterilization part 40 and cooled and then transported inside the clean box, and the lid material, or the soup filling nozzle is positioned above the container opening by displacing the lid material retention means, which is retaining the lid material and covering the container opening, to release the opening of the container, and the soup filling nozzle is used to fill a prescribed amount of the sterilized and cooled soup that is stored in the filling tank 93 from a position above the solid food. Details of the drive mechanism of the soup filling nozzle will be described later.

Figure 13:
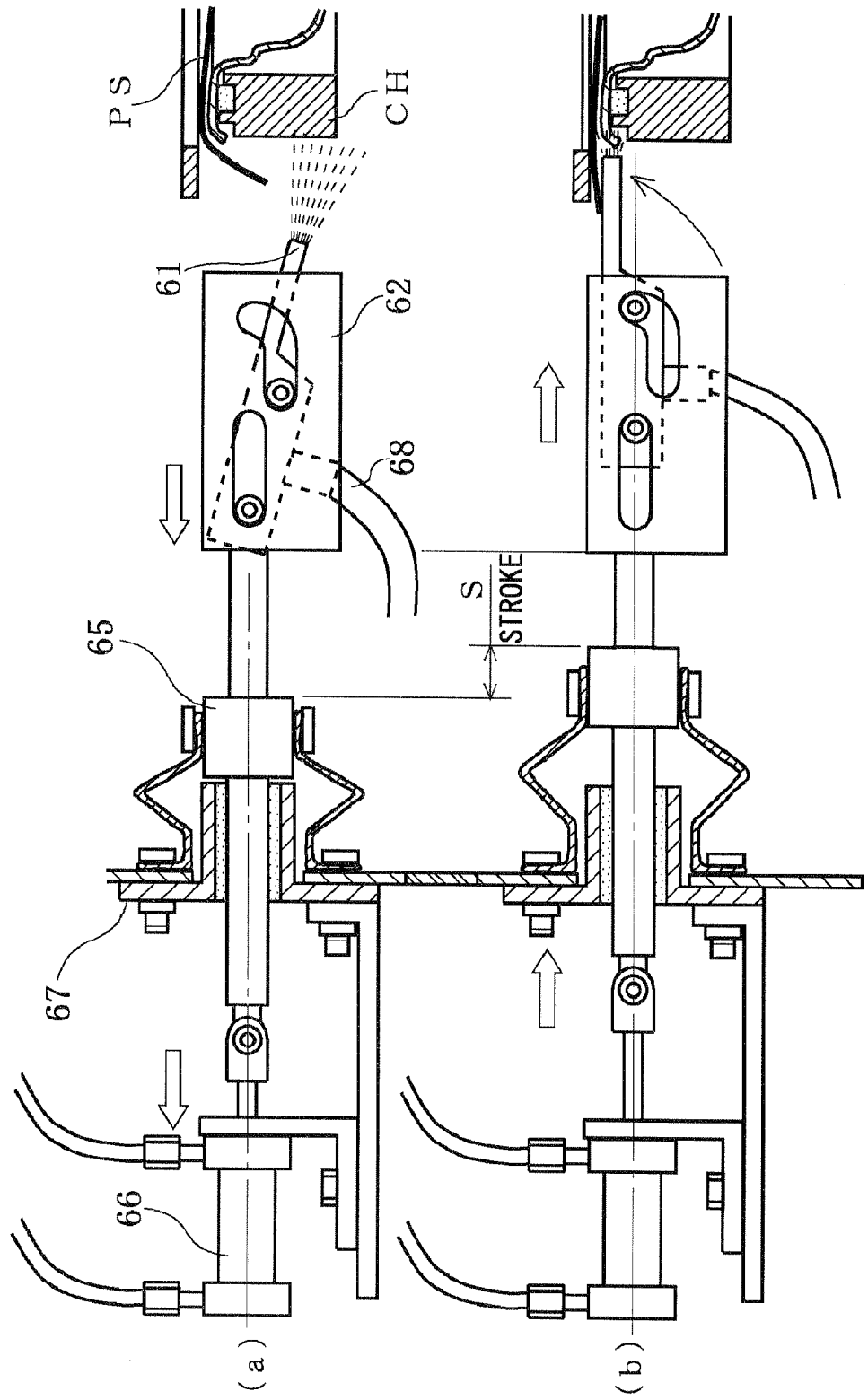
FIG. 13 is an explanatory diagram showing the operation of the gas substitution nozzle according to an embodiment of the present invention.

The gas substitution part 60 will be described in detail later with reference to FIG. 13, but it is configured to make the gas substitution nozzle for spraying gas to come close to the filled cup and spray gas thereon, and, when the spraying is complete, makes the gas substitution nozzle to retract at a distance from the cup so that it will not interfere with the following sealing process.

With the sealing part 70, the heated sealing head presses the pre-seal lid material against the flange portion of the filled cup and fusion bonds the pre-seal lid material to such flange portion, and thereby seals the opening of the filled container.

With the trimming part 80, after heat sealing the opening of the container, the excess lid material that is protruding from the flange portion of the container is cut with a cutter, and the filled container in which its opening has been sealed is shipped as a product with transport means.

The soup supplying part 90 for supplying the soup to the soup filling part 50 is configured from a blending tank 91 for the soup, a heat exchanger 92 configured from a combination of a sterilizer provided downstream of the blending tank for subjecting the blended soup to high-temperature, high-speed sterilization (UHT sterilization) and an rapid cooler provided downstream of such sterilizer, and a filling tank 93. The path from the heat exchanger to the filling nozzle via the filling tank is connected to the soup filling nozzle by a pipe line where it is a gas-tight path preventing the intrusion of outside air and maintains the aseptic condition of the soup. The cooling temperature after the sterilization of the soup is desirably cooled to a temperature that is at least lower than the temperature of the sterilized solid food, although this will also depend on the content fluid.

Practical Example 1

Figure 4:
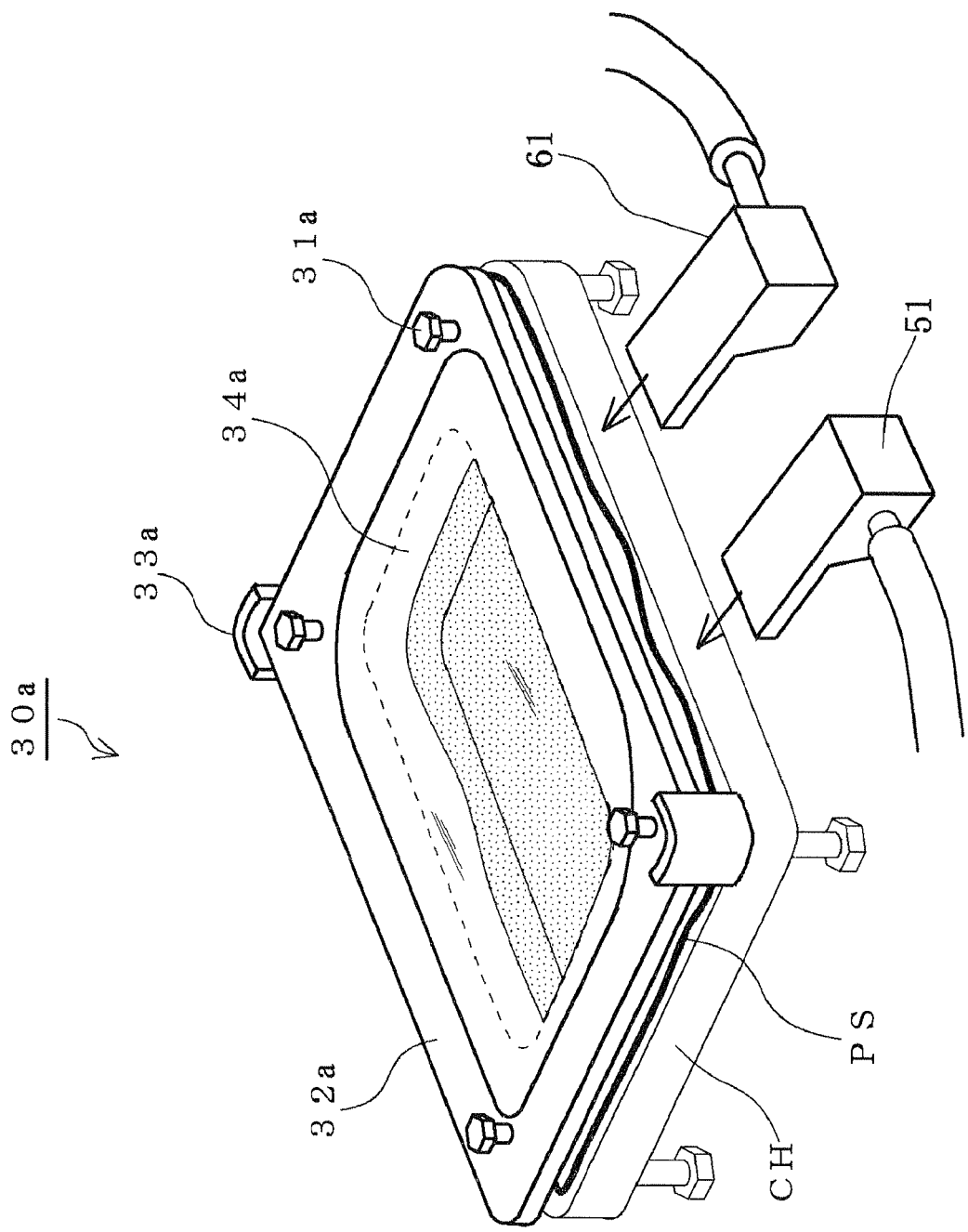
FIG. 4 is an explanatory diagram showing a perspective view of a lid material holder as the lid material retention means in accordance with example 1.

FIG. 4 is an explanatory diagram showing a perspective view of a lid material holder 30a as the lid material retention means in accordance with example 1. Moreover, for the convenience in explanation, the cup holder CH, the soup filling nozzle 51 and the gas substitution nozzle 61 are also shown in FIG. 4. The lid material holder 30a is configured from a holding bolt 31a for pressing the pre-seal lid material PS against the cup holder CH, a bolt support structure 32a for supporting the holding bolt 31a, and a positioning guide 33a for guiding the holding bolt 31a so that it will come in contact with a predetermined location of the pre-seal lid material PS.

The holding bolt 31a retains the pre-seal lid material PS by pressing the peripheral edge of the pre-seal lid material PS against the cup holder CH, for instance, at four points. Accordingly, the ventilation state between the sterilization chamber 46 and the inside of the container is suitably ensured, the steam will flow all the way inside the container when such steam is supplied to the sterilization chamber 46, and the container and the contents can simultaneously be subjected to thermal sterilization. In addition, when supplying sterilized soup with the soup filling nozzle and performing gas substitution in the head space, since the soup filling nozzle 51 or the gas substitution nozzle 61 is able to come close to the vicinity of the head space of the container, the soup can be supplied with accuracy, and the head space of the container can be sufficiently filled with inert gas.

The heat seal bar through-hole 34a is an opening for the heat seal bar HB to pass therethrough, which fusion bonds the pre-seal lid material PS to the flange portion CF of the cup, to pass through after the air in the head space of the cup is replaced with inert gas.

In substitute of the holding bolt 31a pressing the pre-seal lid material PS against the cup holder CH, the holding bolt 31a may also be disposed on the bolt support structure 32a so as to press the pre-seal lid material PS against the flange portion CF of the cup.

Figure 5:
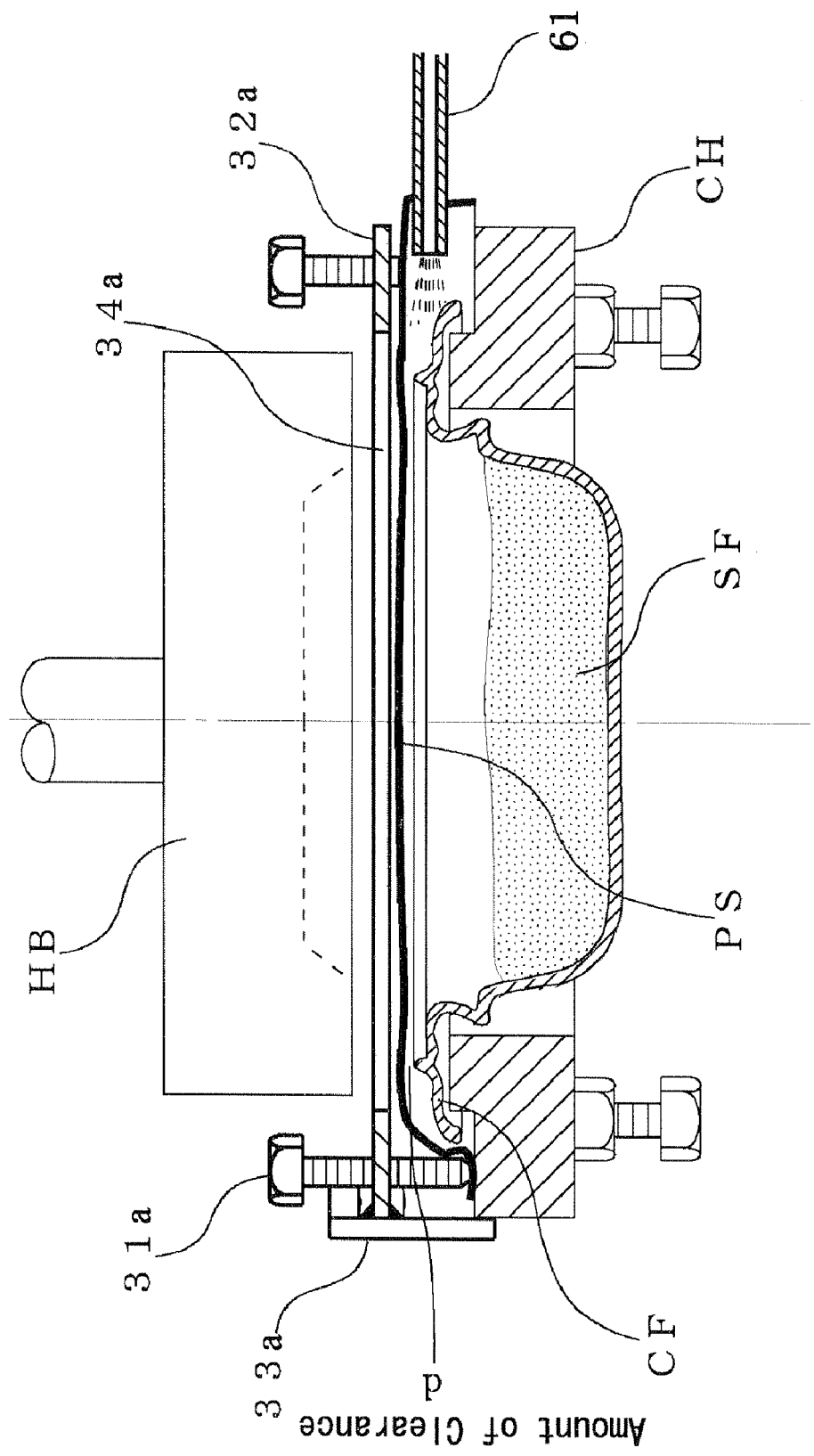
FIG. 5 is an explanatory diagram showing a cross section of a relevant part of the lid material holder.

FIG. 5 is an explanatory diagram showing a cross section of a relevant part of the lid material holder 30a. FIG. 5 also shows a cup holder CH, a heat seal bar HB and a gas substitution nozzle 61.

The high temperature and pressure steam enters inside the cup from the gap between the pre-seal lid material PS and the cup flange portion CF, and thermally sterilizes the food SF filled in the cup and the inner and outer periphery of the cup. Moreover, the amount of clearance d is defined as the distance from the top face of the cup opening to the bottom face of the pre-seal lid material PS (the same shall apply in the ensuing explanation), and in this Practical example the amount of clearance d≈0.0 mm. As described later, the amount of clearance d is desirably large during sterilization from the viewpoint of heating efficiency, and is desirably small during gas substitution from the viewpoint of reducing the amount of inert gas to be used.

As described above, the pre-seal lid material PS is fixed with the holding bolt 31a at a position of covering the cup opening while maintaining the ventilation state between the head space of the cup and the air inside the sterilization chamber without being temporarily fusion bonded to the cup flange portion CF. Accordingly, even if the thermal contraction percentages of the pre-seal lid material PS and the cup are different each other, the cup flange CF will not deform upon the inflow of the high temperature and pressure steam. In addition, the temporary sealing process of partially fusion bonding the pre-seal lid material PS to the cup flange portion CF and the temporary sealing device required for such process are no longer needed, and the overall process of the system and the configuration of the device can thereby be simplified.

Practical Example 2

Figure 6:
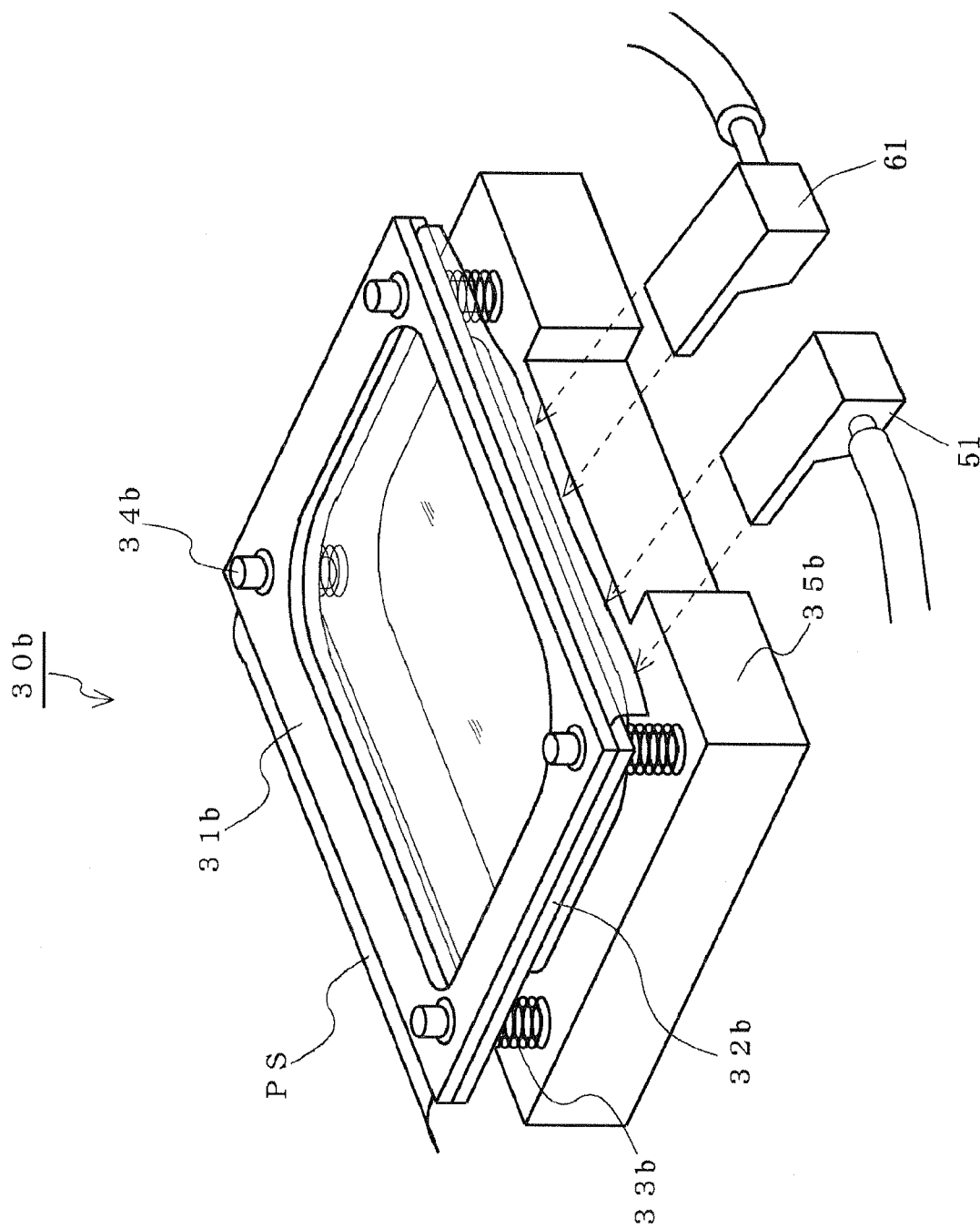
FIG. 6 is an explanatory diagram showing a perspective view of a lid material holder as the lid material retention means in accordance with example 2.

FIG. 6 is an explanatory diagram showing a perspective view of a lid material holder 30b as the lid material retention means in accordance with example 2.

The lid material holder 30b is configured from a lid material weight plate 31b and a lid material support plate 32b as grips for holding the pre-seal lid material PS at a position of covering the cup opening while retaining a distance from the cup and while maintaining a ventilation state between the head space of the cup and the air inside the sterilization chamber, a spring 33b as support means for supporting the lid material weight plate 31b and the lid material support plate 32b, a guide pin 34b that passes through the spring 33b and which is fitted into the through-hole of the lid material weight plate 31b and the lid material support plate 32b, and a cup holder 35b to which the spring 33b and the guide pin 34b are fixed.

The pre-seal lid material PS is held between the lid material weight plate 31b and the lid material support plate 32b at a distance from the cup without being temporarily fusion bonded to the cup flange portion CF. In addition, the spring 33b ensures an amount of clearance d that is suitable for the high temperature and pressure sterilization steam to enter from the gap between the lid material support plate 32b and the cup holder 35b.

The cup holder 35b for receiving the cup is provided with a notch on its surface which faces the soup filling nozzle 51 and the gas substitution nozzle 61 so that the soup filling nozzle 51 and the gas substitution nozzle 61 can be inserted deeply into the container.

Figure 7:
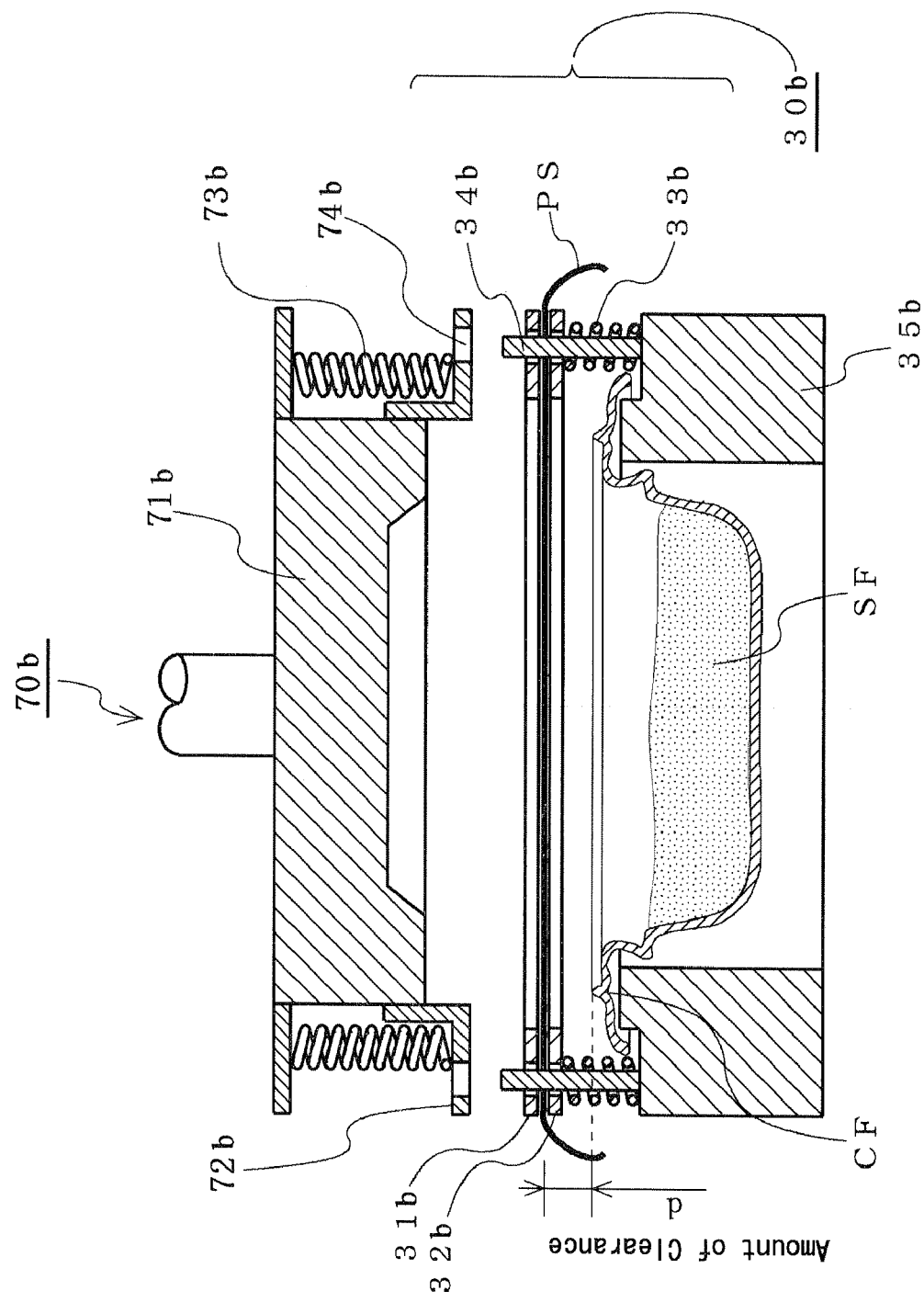
FIG. 7 is an explanatory diagram showing a cross section of a relevant part of a combination of a lid material holder and a heat seal bar.

FIG. 7 is an explanatory diagram showing a cross section of a relevant part of a combination of the lid material holder 30b and the heat seal bar 70b.

The heat seal bar 70b is configured from a sealing head 71b for pressing the pre-seal lid material PS against the cup flange portion CF and fusion bonding it thereto, a spring-lowering stay 72b for pushing down the spring 33b, a lowering stay spring 73b for suspending the spring-lowering stay, and a guide hole 74b into which the guide pin 34b is fitted.

Although not shown, the spring-lowering stay 72b is configured to be slidable in the axial direction. In addition, the spring constant of the lowering stay spring 73b is set to be greater than the spring constant of the spring 33b. Consequently, when the spring-lowering stay 72b and the lid material weight plate 31b become engaged, the spring 33b foremost starts to contract, and the lowering stay spring 73b will subsequently start to contract when the spring 33b reaches the lowest point, and, as a result, the sealing head 71b will descend and press the pre-seal lid material PS against the cup flange portion CF and fusion bond it thereto. Details of this heat sealing operation will be explained later with reference to FIG. 8.

FIG. 8 is an explanatory diagram showing the operation of the lid material holder 30b and the heat seal bar 70b.

Foremost, as shown in FIG. 8(a), the amount of clearance d that is defined as the distance from the top face of the cup opening to the bottom face of the pre-seal lid material PS becomes maximum, and the clearance during steam sterilization is suitably ensured. Moreover, the sealing head 71b and the spring-lowering stay 72b descend toward the cup holder 35b so that the guide pin 34b on the cup holder 35b will be fitted into the guide hole 74b.

As shown in FIG. 8(b), the spring 33b becomes to contract gradually as a result of the sealing head 71b and the spring-lowering stay 72b descending, the spring-lowering stay 72b and the lid material weight plate 31b engaging, and the spring-lowering stay 72b pressing the lid material weight plate 31b. Consequently, the spring 33b becomes to contract to the lowest point, and the optimal amount of clearance d for inert gas substitution of the head space is suitably ensured.

In addition, as described above, the amount of clearance d is desirably large during sterilization from the viewpoint of heating efficiency, and is desirably small during inert gas substitution of the head space from the viewpoint of reducing the amount of inert gas to be used.

As shown in FIG. 8(c), the sealing head 71b and the spring-lowering stay 72b continue to descend and attempt to raise the lid material weight plate 31b, but the lid material weight plate 31b is unable to move any lower since the spring 33b is at its shortest length, and the spring-lowering stay 72b slides vertically upward in relation to the sealing head 71b, and the sealing head 71b will consequently descend. The sealing head 71b thereafter comes in contact with the pre-seal lid material PS while lowering the lowering stay spring 73b, and fusion bonds the pre-seal lid material PS to the cup flange portion CF by pressing the pre-seal lid material PS against the cup flange portion CF.

Accordingly, the pre-seal lid material PS is retained by the lid material holder 30b at the position of covering the cup opening at a distance from the cup while maintaining the ventilation state between the head space of the cup and the air inside the sterilization chamber without being temporarily fusion bonded to the cup flange portion CF. Consequently, even if the thermal contraction percentages of the pre-seal lid material PS and the cup is different each other, the cup flange CF will not deform upon the inflow of the high temperature and pressure steam. Moreover, the process of partially fusion bonding the pre-seal lid material PS to the cup flange portion CF and the temporary sealing device required therefor will no longer be needed, and the overall process of the system and the configuration of the device can thereby be simplified. Moreover, as a result of configuring the heat seal bar 70b as described above, the optimal amount of clearance d can be ensured during the thermal sterilization or during the inert gas substitution of the head space.

Practical Example 3

Figure 9:
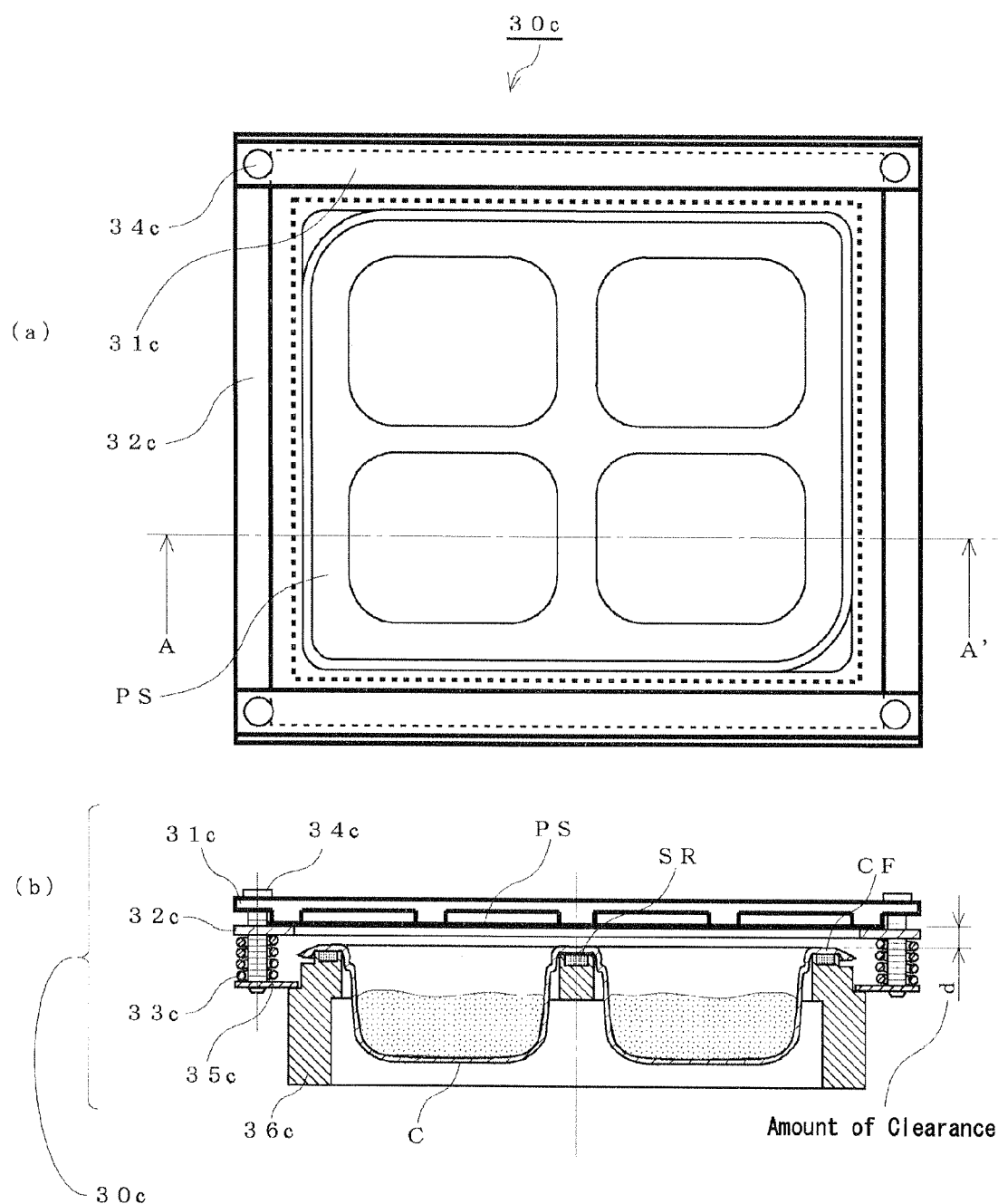
FIG. 9 is an explanatory diagram showing a lid material holder as the lid material retention means in accordance with example 3.

FIG. 9 is an explanatory diagram showing a lid material holder 30c as the lid material retention means in accordance with example 3. Note that, FIG. 9(a) is a plan view, and FIG. 9(b) is an A-A' cross section thereof.

The lid material holder 30c is configured from a film holding member 31c and a film receiving member 32c as grips for holding the pre-seal lid material PS at a position of covering the cup opening while retaining a distance from the cup and while maintaining a ventilation state between the head space of the cup and the air inside the sterilization chamber, a spring 33c as support means for supporting the film holding member 31c and the film receiving member 32c, a pin fastener 34c as guide means which passes through the spring 33c and engages with a plate 35c, a plate 35c which engages with the pin fastener 34c, and a cup holder 36c for receiving the cup. Moreover, the pin fastener 34c and the plate 35c configure the clearance amount adjustment means as described later.

Unlike Practical example 2 in which the entire periphery of the pre-seal lid material PS was held, in this Practical example only one of both edges of the pre-seal lid material PS facing each other is sandwich-held by the film holding members 31c and the film receiving members 32c, and retained at a distance from the cup with the spring 33c.

A female screw (not shown) for engaging with the pin fastener 34c is formed on the plate 35c, and the amount of clearance d can be reduced by tightening the pin fastener 34c (screwing the fastener into the plate 35c) and, contrarily, the amount of clearance d can be increased by loosening the pin fastener 34c. Thus, when supplying steam to the sterilization chamber, a large amount of clearance d is ensured so that a sufficient amount of steam will flow inside the cup and, allowing, without trouble, simultaneous sterilization for the pre-seal lid material, the cup and the contents. Meanwhile, when performing inert gas substitution of the head space of the cup, a small amount of clearance d is ensured so that the inert gas substitution can be performed efficiently while minimizing the escape of inert gas.

The portion of the cup holder 36c to engage with the cup flange portion CF is provided with a groove, and sheet rubber SR is embedded in the groove. The sheet rubber SR enables the pressing force of the sealing head to be uniform when the head is applied to the cup flange portion CF to be uniform, and the impact on the cup flange portion CF can be suitably absorbed during the heat sealing process.

As described above, since the pre-seal lid material PS is retained by the lid material holder 30c at a position of covering the cup opening at a distance from the cup while maintaining the ventilation state between the head space of the cup and the air inside the sterilization chamber without being fusion bonded to the cup flange portion CF, high temperature and pressure steam will spread into every corner of the cup C and the intended sterilization temperature can be easily achieved. In addition, even in cases where the thermal contraction percentages between the pre-seal lid material PS and the cup are different each other, the cup flange portion CF will not deform. In addition, the soup can be filled after the simultaneous thermal sterilization of the solid food, the container, and the lid material. Moreover, the process of partially fusion bonding the pre-seal lid material PS to the cup flange portion CF and the temporary sealing device required therefor will no longer be needed. Consequently, the overall process and device configuration can be simplified. Furthermore, as a result of tightening or loosening the pin fastener 34c to or from the plate 35c, the optimal amount of clearance d can be ensured during the thermal sterilization, during the filling of soup, or during the inert gas substitution of the head space.

(Preferable Range of Amount of Clearance d During Thermal Sterilization)

Even if the amount of clearance d is small, the vacuum degasification allows the steam to flow all the way into the container and the pre-seal lid material, the container and the contents to be simultaneously subjected to thermal sterilization. Meanwhile, if a predetermined amount of clearance d is provided, the container and the contents can be thermally sterilized at a faster rate. Nevertheless, if the amount of clearance d is too large, the food may become dispersed when the steam is supplied or absorb droplets when performing the water cooling described later. In addition, as described above, when giving consideration to the efficiency of gas substitution, the amount of clearance d is preferably set between 1 to 30 [mm], and more preferably set between 3 to 10 [mm]. When inserting the soup filling nozzle, it is necessary to ensure an amount of clearance that is sufficient for making the nozzle tip to face the head space. Thus, the overall lid material holder may be configured to be movable from the cup holder.

Figure 10:
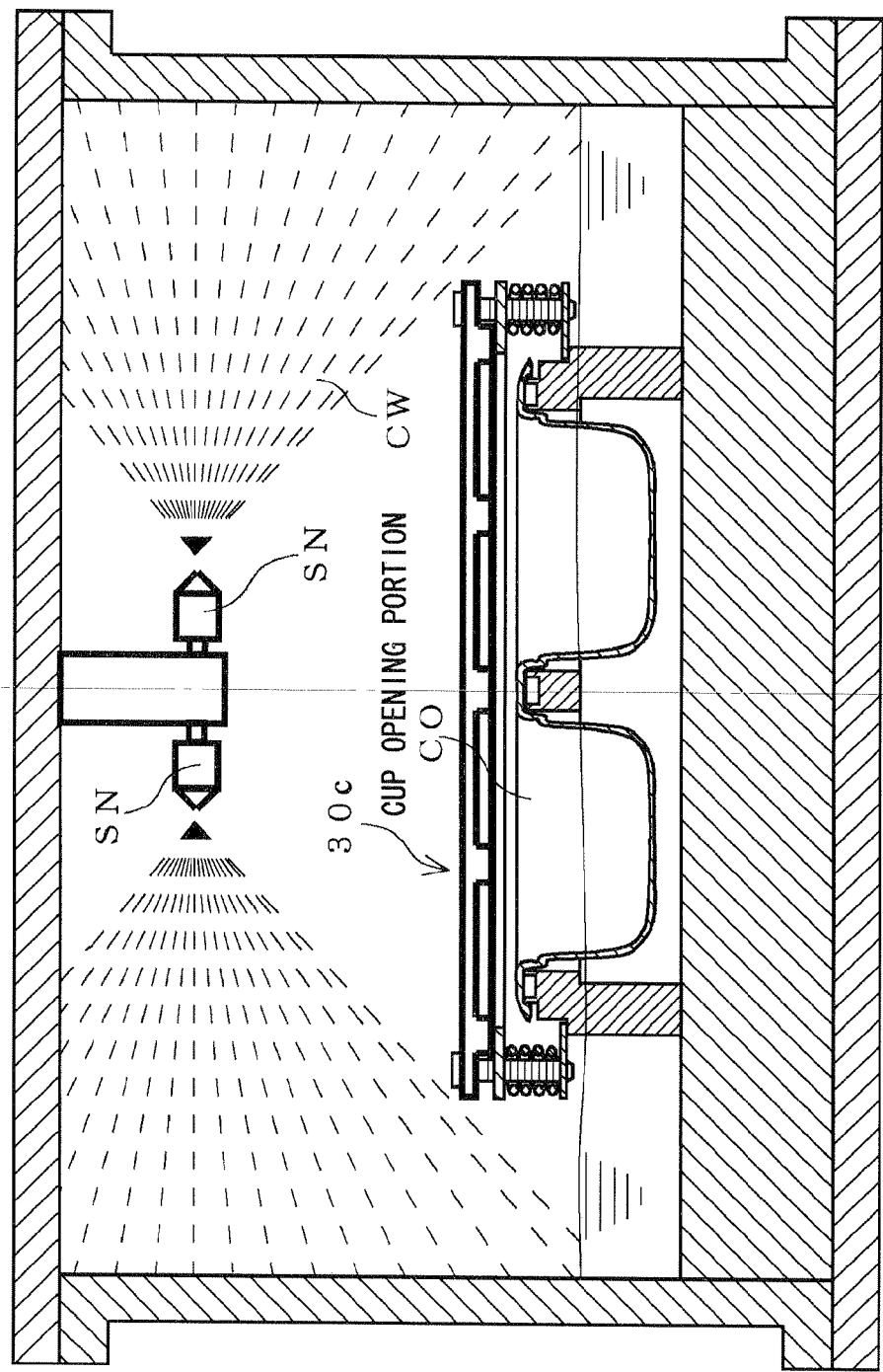
FIG. 10 is an explanatory diagram showing an example of cooling a sterilization chamber after performing steam sterilization.

FIG. 10 is an explanatory diagram showing an example of cooling a sterilization chamber after performing steam sterilization.

When cooling the sterilization chamber in this case, as a result of spraying aseptic cold water CW from the shower nozzle SN, the cold water CW cools the steam inside the sterilization chamber, and additionally cools the wall surface inside the sterilization chamber. The cold water CW is finally collected and stored at the bottom part inside the sterilization chamber so that the cup C will be partially soaked in the cold water CW. Note, however, that the water level of the cold water CW is controlled to be below the opening CO of the cup. Moreover, the cold water CW is sprayed in a direction where it will not be directly sprayed on the lid material holder 30c. Consequently, the heated cup after the steam sterilization can be suitably cooled and the inside of the sterilization chamber can also be suitably cooled. Aseptic medical water is used as the cold water CW.

Figure 11:
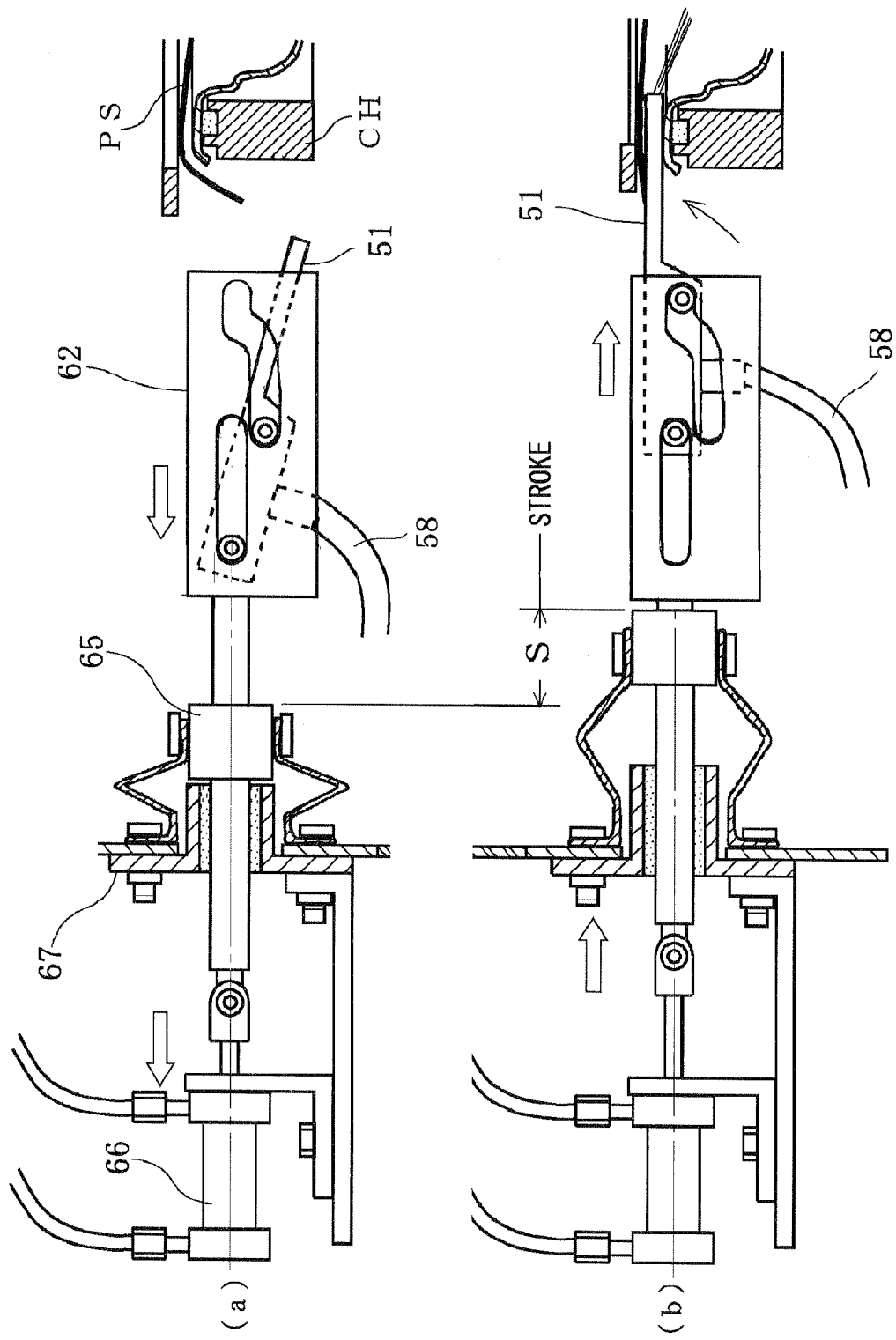
FIG. 11 is an explanatory diagram showing the actuation of a soup filling nozzle.

FIG. 11 is an explanatory diagram showing the actuation of a soup filling part 50. Note that, FIG. 11(a) shows a state where the soup filling nozzle 51 is retracted, and FIG. 11(b) shows a state where the soup filling nozzle 51 is filling soup in a cup filled with solid food. Since the drive mechanism of the soup filling nozzle of this embodiment is of the same mechanism as the drive mechanism of the gas substitution nozzle shown in FIG. 12, the same components are given the same reference numeral, and the detailed mechanism will be explained with reference to FIG. 12.

With the drive mechanism of the soup filling nozzle of this embodiment, for instance, if the pre-seal lid material PS that is protruding from the cup flange portion CF is hanging, there is a problem in that the hanging lid material will interfere with the entry of the nozzle and the nozzle will not be able to enter the container opening if the nozzle is only able to engage in linear motion. However, the soup filling part 50 of this embodiment includes filling nozzle displacement means that is capable of overcoming the foregoing problem. Specifically, due to a pickup cam 62 configuring the filling nozzle displacement means of the soup filling part 50 of this invention, the soup filling nozzle 51 is able to conduct reciprocating motion and elliptic motion. Consequently, even in cases where the pre-seal lid material PS is hanging as shown in FIG. 11(a), the soup filling nozzle 51 will be able to lift up the pre-seal lid material PS, and face the head space of the cup as shown in FIG. 11(b). Note that, reference number 58 in FIG. 11 is the soup supply line for supplying the soup to the soup filling nozzle 51.

In FIG. 11(a), as a result of the rod of the air cylinder 66 moving forward, the pusher rod 65 will also move forward and, consequently, the soup filling nozzle 51 will change its discharge direction upward due to the pickup cam 62 while approaching the cup holder CH. In FIG. 11(b), as a result of the rod of the air cylinder 66 further moving forward, the pusher rod 65 is pushed further forward and, consequently, the soup filling nozzle 51 will approach the cup holder CH while moving in an elliptical orbit and lifting up the pre-seal lid material PS, and supply the soup to the cup.

Moreover, with the soup filling part 50, the discharge direction of the soup filling nozzle 51 is changed with the air cylinder 66 and the pickup cam 62. However, a separate hinge or the like may also be used to cause the discharge direction of the soup filling nozzle 51 to be variable.

Figure 12:
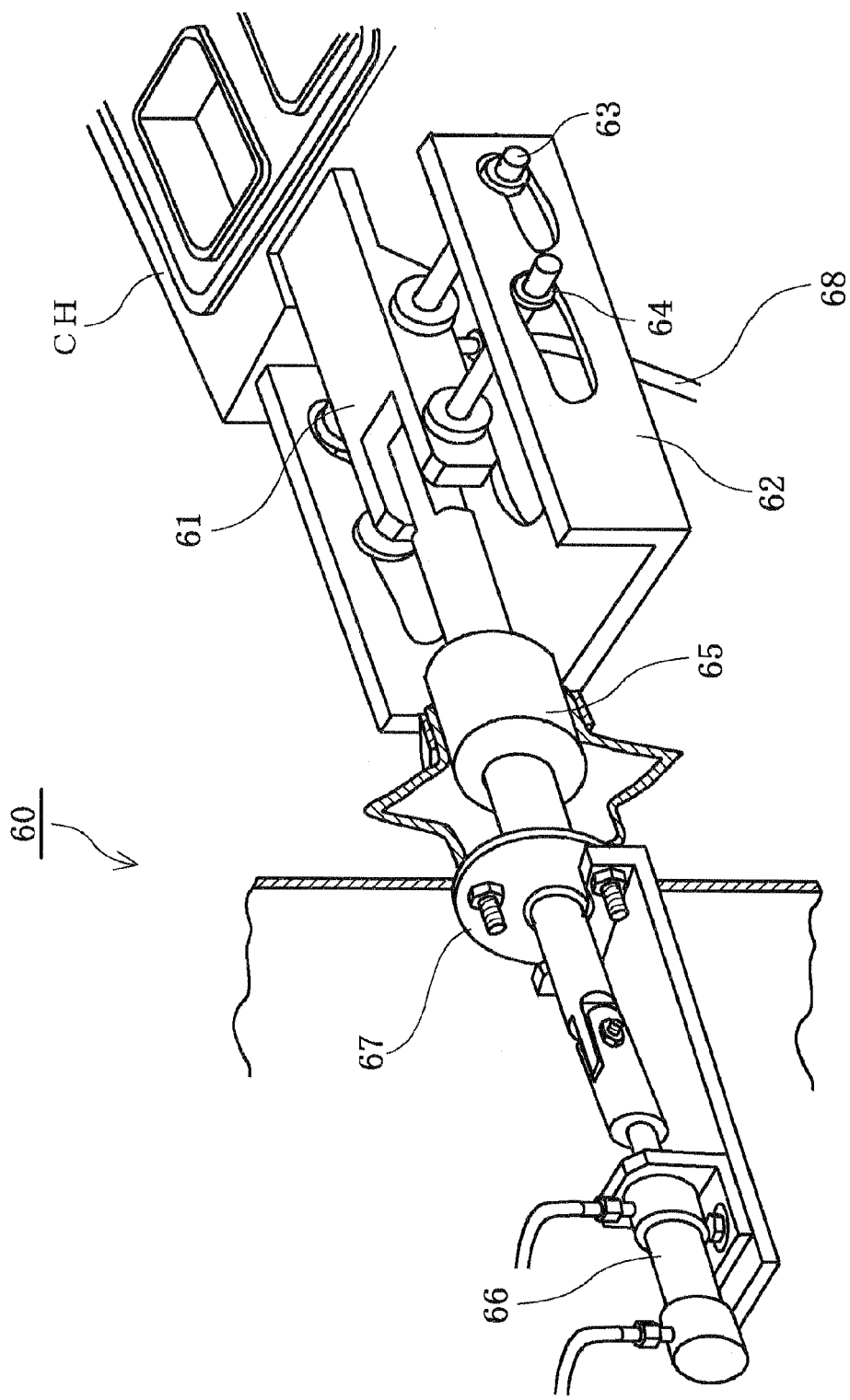
FIG. 12 is an explanatory diagram showing a drive mechanism of a gas substitution nozzle according to an embodiment of the present invention.

FIG. 12 shows an embodiment of the drive mechanism of the gas substitution nozzle in the gas substitution part 60 according to the present invention.

The gas substitution part 60 is configured from a gas substitution nozzle 61 for blowing inert gas into the head space, a pickup cam 62 for making the discharge direction of the nozzle to be variable, an arm 63 for transferring the action of the pickup cam 62, a roller 64 for reducing the friction of the arm 63 on the pickup cam 62, a pusher rod 65 for transferring the reciprocating power of the air cylinder to the soup filling nozzle 51, an air cylinder 66 for generating the reciprocating power, a rod holder 67 for retaining the pusher rod, and an inert gas supply line 68 for supplying inert gas to the gas substitution nozzle 61.

FIG. 11 shows the drive mechanism of the soup filling nozzle, and the same mechanism may be adopted for the gas substitution nozzle drive mechanism. FIG. 13 shows the state of inert gas substitution, after filling the soup, with the gas substitution nozzle in the gas substitution part 60, and corresponds to FIG. 11 showing the status during the filling of the soup. The same configuration is given the same reference numeral as FIG. 12 and the detailed explanation thereof is omitted. When performing inert gas substitution of the head space, since the gas substitution nozzle 61 is not required to face the upper direction of the head space of the container as with the soup filling nozzle 51, the stroke of the gas substitution nozzle 61 during the gas substitution will be small as shown in FIG. 11, and the nozzle tip merely needs to be facing the gap (clearance) between the flange of the cup and the pre-seal lid material PS.

Practical Example 4

Figure 14:
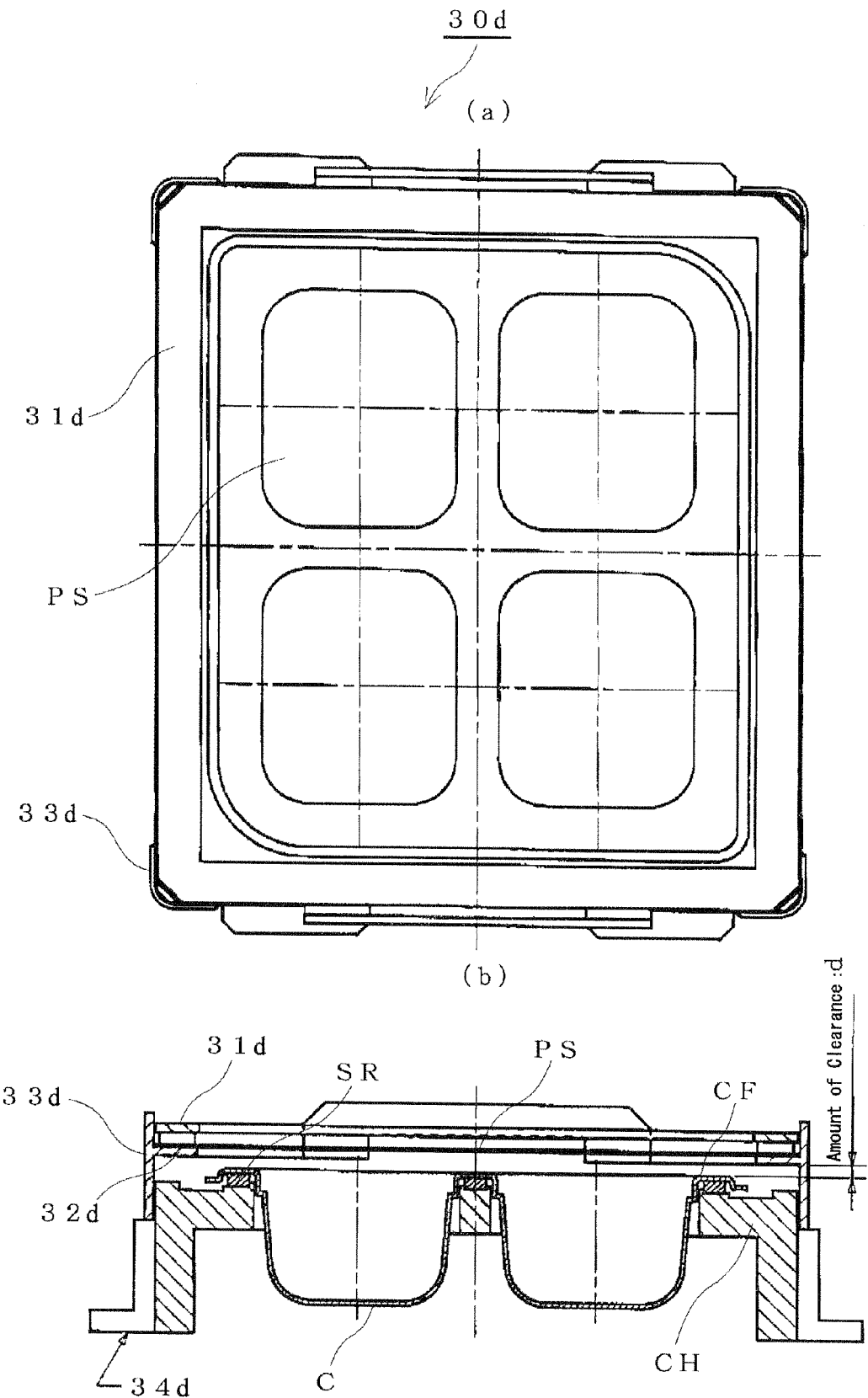
FIG. 14 is an explanatory diagram showing a lid material holder as the lid material retention means in accordance with example 4.

FIG. 14 is an explanatory diagram showing a lid material holder 30d as the lid material retention means in accordance with example 4. Note that, FIG. 14(a) is a plan view, and FIG. 14(b) is a cross section of the relevant part thereof.

The lid material holder 30d is configured from a film holding member 31d and a film receiving member 32d as grips for holding the pre-seal lid material PS at a position of covering the cup opening while retaining a distance from the cup and while maintaining a ventilation state between the head space of the cup and the air inside the sterilization chamber, a positioning guide 33d as support means and guide means for guiding the film holding member 31d and the film receiving member 32d to the cup holder CH, and a guide 34d as clearance amount adjustment means that is disposed in the sterilization chamber 46 and which supports the positioning guide 33d.

The pre-seal lid material PS is mounted on the film receiving member 32d and the upper part thereof is fixed by the film holding member 31d. Note that the film holding member 31d is merely mounted on the film receiving member 32d.

The cup holder CH is disposed between the guides 34d in the sterilization chamber 46. Meanwhile, as described later, the guide 34d supports the positioning guide 33d so as to ensure a large amount of clearance d and allow a sufficient amount of steam to flow along the inner and outer periphery of the cup C.

FIG. 15 is an explanatory diagram showing the adjustment of the amount of clearance d during the thermal sterilization, during the filling of the soup, or during the inert gas substitution of the head space.

As shown in FIG. 15(a), the cup holder CH is disposed between the guide 34d of the steam sterilization part and the soup filling part, the film holding member 31d and the film receiving member 32d to which the pre-seal lid material PS is mounted and fixed are subsequently guided by the positioning guide 33d, and the positioning guide 33d engages with the guide 34d. Consequently, the pre-seal lid material PS is retained at a position of covering the opening of the cup C at a distance in the amount of clearance d from the top face of the cup opening (cup flange portion CF). As a result of ensuring a large amount of clearance d as described above, a sufficient amount of steam will be able to flow along the inner and outer periphery of the cup. Consequently, the pre-seal lid material, the cup and the contents can be thermally sterilized more quickly. In addition, the large amount of clearance suitably allows the soup filling nozzle to insert inside thereof.

As shown in FIG. 15(b), when the cup holder CH passes the soup filling part 50, the positioning guide 33d will be lowered since it will no longer be supported by the guide 34d and, consequently, the film holding member 31d and the film receiving member 32d will also be lowered and the film receiving member 32d will be retained by the cup flange portion CF. The amount of clearance d will thereby decrease extremely. The gas substitution nozzle GN supplies inert gas into the head space of the cup, and it is possible to efficiently perform inert gas substitution of the head space of the cup while minimizing the escape of the gas due to the small amount of clearance d. As a result of non-support by the guide 34d, the amount of clearance d that is optimal for the inert gas substitution of the head space can be ensured.

With the lid material holder in accordance with example 4, a large amount of clearance d can be ensured during thermal sterilization, and when filling the soup on the one hand, a small amount of clearance d can be automatically ensured during the gas substitution of the head space.

Figure 16:
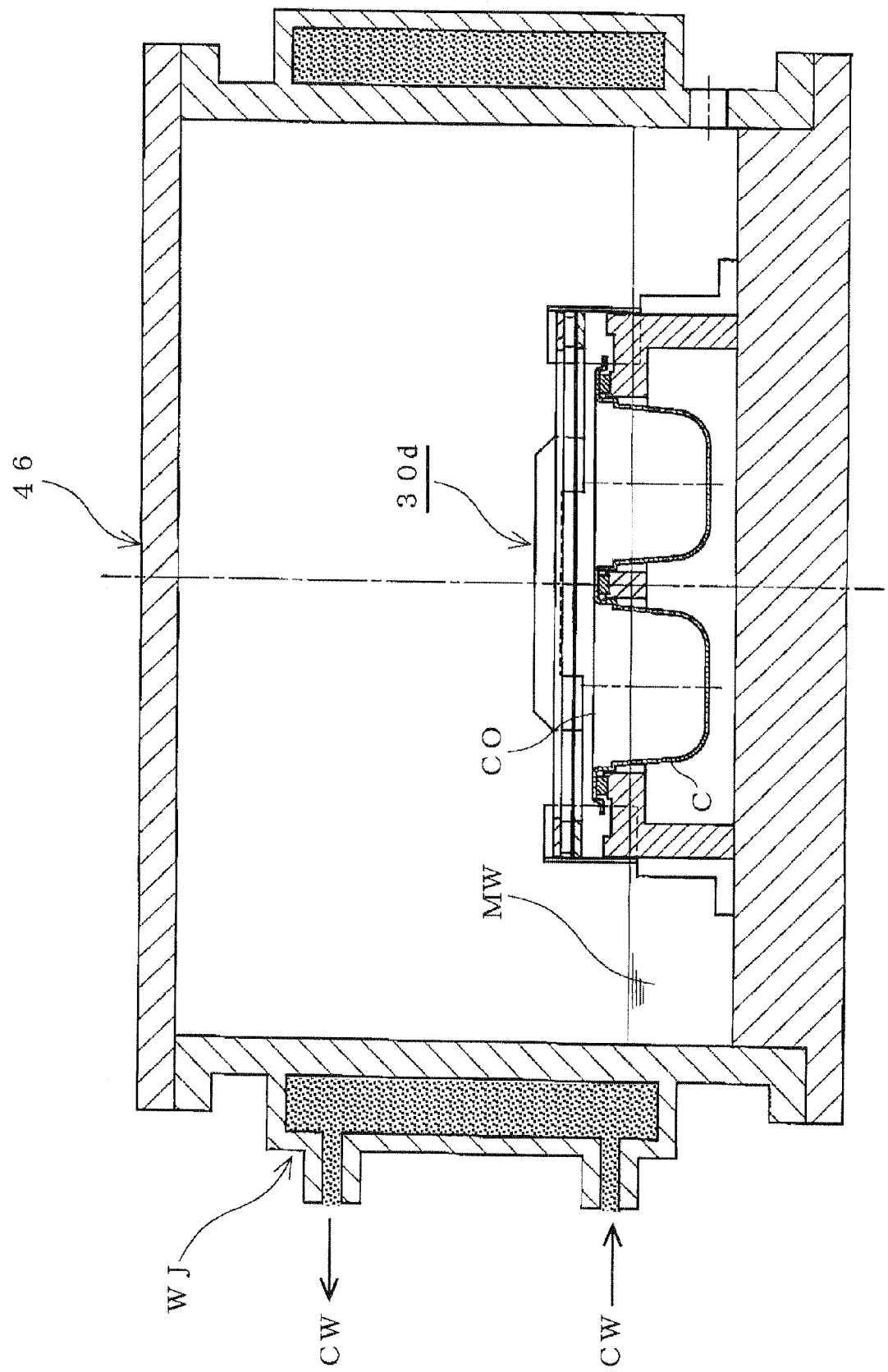
FIG. 16 is an explanatory diagram showing another embodiment of cooling the sterilization chamber and the cup after performing steam sterilization.

FIG. 16 is an explanatory diagram showing another example of cooling the sterilization chamber and the cup after performing steam sterilization.

When cooling of the sterilization chamber in this case, a water jacket NJ is formed on a wall of the sterilization chamber 46, and cold water CW is circulated therein. Consequently, the cold water CW will cool the wall of the sterilization chamber 46, which in turn will draw heat from the steam remaining in the vicinity of the wall. Non-aseptic water; for instance, a tap water may be used as the cold water CW.

When cooling the cup, the cup C is partially soaked in aseptic water MW so that the water level will be below the opening CO of the cup C. Consequently, the dispersion of droplets will not occur unlike the shower method and, therefore, droplets will not come into the contents. The heated cup after the steam sterilization can thereby be suitably cooled.

Various embodiments and examples of the present invention have been explained above. However, the present invention shall not be limited to the foregoing embodiments or examples, and the design thereof may be modified variously within the scope of the technical concept of the invention. For example, in the embodiments as shown in FIG. 11, the soup filling nozzle moves from the side in relation to the container to face the opening of the container. However, the soup filling nozzle may also be disposed above the transport path of the container, for example, as schematically shown in FIG. 2 if the overall lid retention means is raised in the clean room and displaced to a position that will not interfere with the entry of the soup filling nozzle from above.

INDUSTRIAL APPLICABILITY

The sterilization method of container-packaged food and filling system of the present invention can be suitably applied to a container filled with a mixture of solid food/soup including juice, a container with multiple rooms containing different foods, as well as to a container made of resin or a container of which the contraction percentage in the vicinity of the sterilization temperature is considerably different compared with that of the lid material as, for instance, a film containing aluminum foil.

The invention claimed is:

1. A sterilization method of container-packaged food which simultaneously subjects a container and a lid material to thermal sterilization by introducing high temperature and pressure steam into a sterilization chamber, wherein the food is a mixture of solid food/soup including juice, a container that is pre-filled with solid food is mounted on a holder of the sterilization chamber, the steam is introduced into the sterilization chamber while a pre-seal lid material that is pre-cut to a dimension to at least cover an opening of the container is retained at a position covering the opening of the container without being fusion bonded to the container and a ventilation state is maintained between a head space of the container and the inside of the sterilization chamber, the container and the pre-seal lid material are simultaneously subjected to thermal sterilization together with the solid food, and sterilized soup is thereafter filled in the container.

2. The sterilization method of container-packaged food according to claim 1, wherein the pre-seal lid material is retained by partially pressing a portion of the pre-seal lid material that is protruding from an outer edge of a flange of the container against the holder.

3. The sterilization method of container-packaged food according to claim 1, wherein the pre-seal lid material is retained by partially pressing a non-heat seal portion of the pre-seal lid material on a flange of the container against the flange.

4. The sterilization method of container-packaged food according to claim 1, wherein the pre-seal lid material is retained at a distance from a flange of the container while holding an edge of the pre-seal lid material.

5. The sterilization method of container-packaged food according to claim 1, wherein an amount of clearance from the flange of the container to the pre-seal lid material is ensured to be large when the steam is introduced into the sterilization chamber and when soup is filled in the container, and ensured to be small when air in the head space of the container is replaced with inert gas.

6. The sterilization method of container-packaged food according to claim 1, wherein the steam is introduced into the sterilization chamber after subjecting the sterilization chamber to vacuum depressurization, and discharged therefrom after being retained for a predetermined time.

7. The sterilization method of container-packaged food according to claim 6, wherein, upon discharging the steam from inside the sterilization chamber, pressure in the sterilization chamber is adjusted by introducing inert gas or air into the sterilization chamber so that pressure in the sterilization chamber is higher by 0.01 to 0.1 MPa in relation to saturated steam pressure at a temperature of the food, and then the container and the pre-seal lid material are cooled.

8. The sterilization method of container-packaged food according to claim 6, wherein, after discharging the steam, the container and the pre-seal lid material are cooled while depressurizing the sterilization chamber.

9. The sterilization method of container-packaged food according to claim 1, wherein the soup is subjected to high-temperature short-time sterilization and cooled, and thereafter filled in a container containing sterilized solid food which was transferred from the sterilization chamber to an aseptic room, and the solid food and the container are cooled by the soup.

10. The sterilization method of container-packaged food according to claim 1, wherein, after cooling the container and the pre-seal lid material, gas substitution is performed by introducing inert gas into a head space of the container through a gas substitution nozzle for a predetermined period, and the gas substitution nozzle is thereafter retracted and the container opening is sealed.

11. The sterilization method of container-packaged food according to claim 10, wherein, filling of the soup, the gas substitution, and sealing of the container opening are performed in an aseptic room.

12. A filling system of container-packaged food, the system being equipped with a holder for mounting a container filled with food, and steam supply means for supplying, to a sterilization chamber, high temperature and pressure steam for simultaneously sterilizing the container and a lid material, wherein the food is a mixture of solid food/soup, the filling system further having: container retention means for retaining a pre-seal lid material that is pre-cut to a dimension to at least cover an opening of the container at a position covering the opening of the container without being fusion bonded to the container and maintaining a ventilation state between a head space of the container and the inside of the sterilization chamber; and soup high-temperature short-time sterilization means for sterilizing soup at a high temperature and short time, and the container and the pre-seal lid material being simultaneously subjected to thermal sterilization together with the solid food, and soup that has been sterilized by the soup high-temperature short-time sterilization means being filled in a sterilized container filled with solid food.

13. The filling system of container-packaged food according to claim 12, wherein the container retention means is configured from a plate having a pin for pressing a portion of the pre-seal lid material that is protruding from an outer edge of a flange of the container, and the holder for receiving the pin.

14. The filling system of container-packaged food according to claim 12, wherein the container retention means is configured from a plate having a pin for pressing a non-heat seal portion of the pre-seal lid material on a flange of the container, and the holder for receiving the pin.

15. The filling system of container-packaged food according to claim 12, wherein the container retention means is configured from a grip for holding an edge of the pre-seal lid material, support means for supporting the grip, and guide means for guiding the grip to a predetermined position.

16. The filling system of container-packaged food according to claim 12, comprising clearance amount adjustment means for adjusting an amount of clearance from a flange of the container to the pre-seal lid material.

17. The filling system of container-packaged food according to claim 12, wherein the steam supply means includes a vacuum pump, introduces steam into the sterilization chamber after having subjected the inside of the sterilization chamber to vacuum depressurization, and discharges therefrom the steam after having retained the steam therein for a predetermined time.

18. The filling system of container-packaged food according to claim 17, wherein, upon discharging the steam from inside the sterilization chamber, pressure in the sterilization chamber is adjusted by introducing inert gas or air into the sterilization chamber so that pressure in the sterilization chamber is higher by 0.01 to 0.1 MPa in relation to saturated steam pressure at a temperature of the food, and then the container and the pre-seal lid material are cooled.

19. The filling system of container-packaged food according to claim 17, wherein, after discharging the steam, the container and the pre-seal lid material are cooled while depressurizing the sterilization chamber.

20. The filling system of container-packaged food according to claim 12, comprising a soup filling nozzle for filling soup in a container from which the steam has been discharged, and filling nozzle displacement means for displacing the filling nozzle in order to fill soup in the container from a gap between an opening of the container and the lid material or by lifting the lid material.

21. The filling system of container-packaged food according to claim 12, comprising a gas substitution nozzle for introducing inert gas into a head space of the contained for a predetermined period after the container and the pre-seal lid material are cooled, and sealing means for sealing the container opening upon retracting the gas substitution nozzle after gas substitution.

* * * * *